United States Patent

Makida

(10) Patent No.: US 9,734,048 B2
(45) Date of Patent: Aug. 15, 2017

(54) STORAGE MANAGEMENT DEVICE, PERFORMANCE ADJUSTMENT METHOD, AND COMPUTER-READABLE RECORDING MEDIUM

(71) Applicant: FUJITSU LIMITED, Kawasaki-shi, Kanagawa (JP)

(72) Inventor: Toshiharu Makida, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/856,639

(22) Filed: Sep. 17, 2015

(65) Prior Publication Data

US 2016/0147476 A1    May 26, 2016

(30) Foreign Application Priority Data

Nov. 20, 2014  (JP) ................................. 2014-235291

(51) Int. Cl.
*G06F 12/02* (2006.01)
*G06F 3/06* (2006.01)

(52) U.S. Cl.
CPC ............ *G06F 12/023* (2013.01); *G06F 3/061* (2013.01); *G06F 3/0649* (2013.01); *G06F 3/0685* (2013.01); *G06F 2212/1044* (2013.01)

(58) Field of Classification Search
None
See application file for complete search history.

(56) References Cited

U.S. PATENT DOCUMENTS

| | | |
|---|---|---|
| 2003/0093647 A1 | 5/2003 | Mogi et al. |
| 2010/0100604 A1* | 4/2010 | Fujiwara ............. G06F 12/0866 709/213 |
| 2012/0017042 A1 | 1/2012 | Matsui et al. |
| 2012/0166748 A1 | 6/2012 | Satoyama et al. |
| 2012/0266011 A1 | 10/2012 | Storer et al. |
| 2012/0311602 A1* | 12/2012 | Deguchi .................. G06F 3/061 718/105 |
| 2013/0159557 A1* | 6/2013 | Bita ...................... G06F 3/0604 710/6 |
| 2013/0185482 A1 | 7/2013 | Kim et al. |

(Continued)

FOREIGN PATENT DOCUMENTS

| | | |
|---|---|---|
| JP | 2003-150419 | 5/2003 |
| JP | 2008-108050 | 5/2008 |

(Continued)

*Primary Examiner* — Brian Peugh
*Assistant Examiner* — Dustin Bone
(74) *Attorney, Agent, or Firm* — Fujitsu Patent Center

(57) ABSTRACT

A receiving unit receives an input of information of a performance level with respect to a volume that is allocated by using different types of disks. A target value calculating unit calculates, on the basis of a distribution ratio that is previously determined for each type of the disks, a target value of the performance of sending and receiving data to and from the volume. On the basis of the target value calculated by the target value calculating unit, a performance management unit determines a distribution ratio for each type of the disks allocated to the volume, determines a band distribution with respect to the volume, and instructs the storage device to re-allocate the volume by using the determined distribution ratio and adjust the bandwidth in accordance with the determined band distribution.

8 Claims, 10 Drawing Sheets

(56) References Cited

U.S. PATENT DOCUMENTS

2013/0290529 A1   10/2013  Gordon et al.
2014/0006350 A1    1/2014  Fukui et al.

FOREIGN PATENT DOCUMENTS

| | | |
|---|---|---|
| JP | 2013-527942 | 7/2013 |
| JP | 2013-536478 | 9/2013 |
| JP | 2014-10465 | 1/2014 |
| JP | 2014-506367 | 3/2014 |
| JP | 2014-132457 | 7/2014 |
| JP | 2014-517952 | 7/2014 |
| WO | 2012007999 | 1/2012 |
| WO | 2012090247 | 7/2012 |
| WO | 2012104847 | 8/2012 |
| WO | 2012142027 | 10/2012 |

\* cited by examiner

| TARGET RESPONSE TIME CALCULATION PARAMETER FOR EACH UNIT OF I/O SIZE | | | |
|---|---|---|---|
| AT TIME OF CACHE HIT | | AT TIME OF CACHE MISS HIT | |
| PROPORTIONAL-ITY COEFFICIENT | FIXED TIME | PROPORTIONAL-ITY COEFFICIENT | FIXED TIME |
| 1 ms/MB | 0 ms | 10 ms/MB | 0.5 ms |

STORAGE MANAGEMENT DEVICE, PERFORMANCE ADJUSTMENT METHOD, AND COMPUTER-READABLE RECORDING MEDIUM

CROSS-REFERENCE TO RELATED APPLICATION

This application is based upon and claims the benefit of priority of the prior Japanese Patent Application No. 2014-235291, filed on Nov. 20, 2014, the entire contents of which are incorporated herein by reference.

FIELD

The embodiments discussed herein are related to a storage management device, performance adjustment method, and a computer-readable recording medium.

BACKGROUND

In recent years, with the virtualization of open systems and servers, management of systems is becoming complicated. Consequently, using storage systems becomes common from the viewpoint of easily managing the systems or flexibly coping with a rapid increase in amount of data.

In the storage systems, disks with different speeds can be used. For example, examples of the disks include solid state disks (SSDs), serial attached small computer system interface hard disk drives (SAS HDDs), serial advanced technology attachment (SATA) HDDs, and the like.

In such a storage system, there may be a case in which several types of disks that have different speeds are used in the storage system and a storage area that is referred to as a single volume is created. Furthermore, for disks with different speeds in a single volume, a technology of tiering storage in an automated way, in which a storage location of data is determined according to a use frequency has been widely used.

If the technology of tiering storage in an automated way is used, for example, data that is frequently used is stored in a high speed disk in a volume, whereas data that is less frequently used is stored in a low speed disk in the volume. Then, due to automated storage tiering, it is possible to implement high-capacity high-speed storage devices at low cost.

Furthermore, for performance adjustment of storage, for example, adjustment of the band limit width of a data transfer path between a volume and a server that executes an application is performed. This function is sometimes referred to as the Quality of Service (QoS).

As a technology of adjusting the performance of storage, for example, there is a conventional technology of adjusting an amount of data passing through multipath channels. Furthermore, there is a conventional technology of determining each piece of data is allocated to which of disks with different speeds. Furthermore, there is a conventional technology of adjusting the performance by adjusting cache adjustment and prefetch target.

Patent Document 1: Japanese Laid-open Patent Publication No. 2008-108050

Patent Document 2: Japanese National Publication of International Patent Application No. 2013-527942

Patent Document 3: Japanese Laid-open Patent Publication No. 2003-150419

If the performance of a storage system is adjusted, it is conceivable to implement an appropriate performance by automatically calculating, using the distribution ratio of the current actual measurement and the performance ratio of each disk, a target performance and by adjusting the band limit width or distribution ratio of the disks. However, if a target performance is calculated by using the distribution ratio of the actual measurement, the difference between the calculated target performance and the distribution ratio of the actual measurement occurs due to approximately the influence of a difference of the performance ratio of the disks. Consequently, even if the performance is adjusted so as to satisfy the calculated target performance, insufficient adjustment is only performed on the band limit width and thus the distribution ratio of the disks is almost the same as that of the actual measurement.

Furthermore, with the conventional technology of adjusting an amount of data passing through a multipath path channels, the distribution ratio of disks is not considered; therefore, it is difficult to appropriately adjust the distribution ratio of the disks. Furthermore, even if the conventional technology that determines disks in each of which a storage area for each piece of data is allocated, it is also difficult to appropriately adjust the distribution ratio of the disks in the tired storage. Furthermore, even if the conventional technology that adjusts the cache adjustment and the prefetch target, it is also difficult to appropriately and automatically adjust the distribution ratio of disks in accordance with the performance ratio that is requested for each tier.

SUMMARY

According to an aspect of an embodiment, a storage management device manages a storage device including a plurality of types of storage units with different performance to which sends and receives data via transmission resources: a memory region; and a controller that receives an input of information of a performance level with respect to a storage area that is allocated by using the different types of the storage units, stores the information of the performance level in the memory region, calculates, on the basis of a fixed distribution ratio that is previously determined for each type of the storage units, a target value of the performance of sending and receiving data to and from the storage area, determines, on the basis of the calculated target value, a distribution ratio for each type of the storage units allocated to the storage area, determines, on the basis of the target value calculated by the target value calculating, a band distribution with respect to the storage area, and instructs the storage device to re-allocate the storage area by using the determined distribution ratio and adjust the bandwidth in accordance with the determined band distribution.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred Embodiments of the Present Invention will be explained with reference to accompanying drawings. The storage management device, the performance adjustment method, and the performance adjustment program are not limited to the embodiments described below.

[a] First Embodiment

Figure 1:
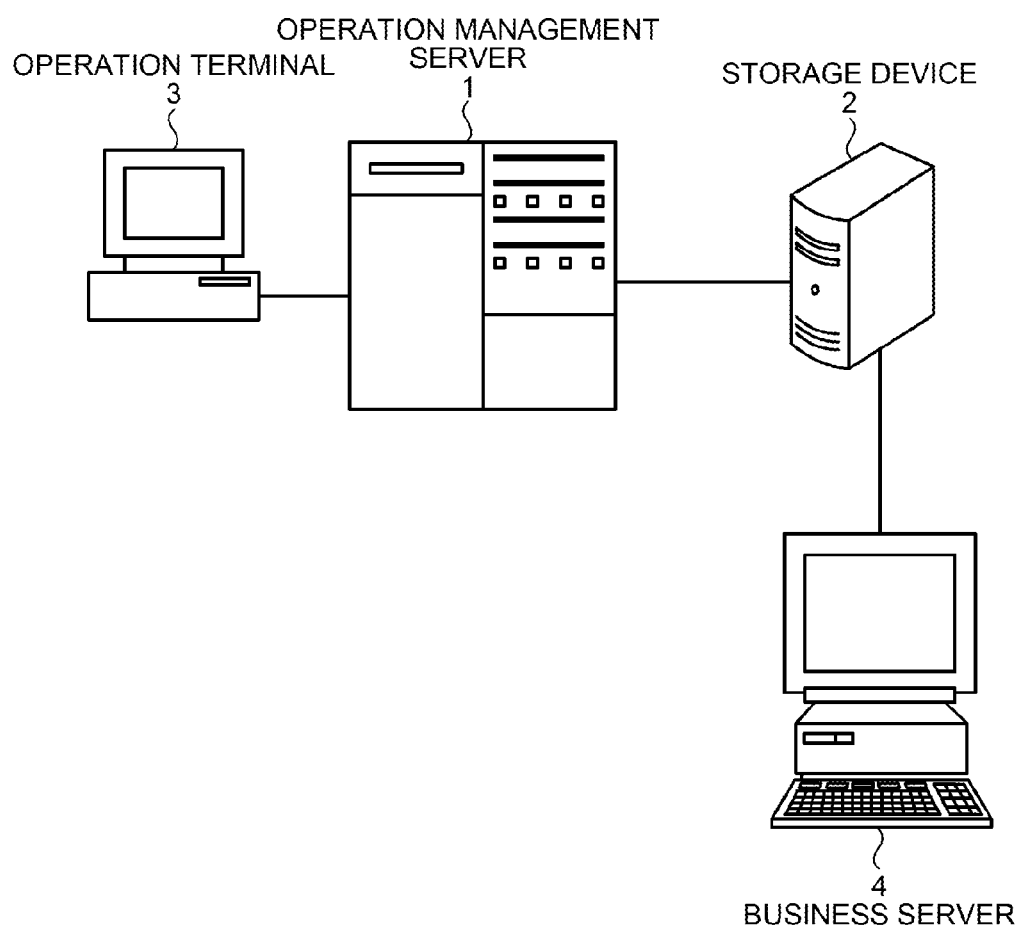
FIG. 1 is a schematic diagram illustrating, in outline, the configuration of a storage system.

FIG. 1 is a schematic diagram illustrating, in outline, the configuration of a storage system. As illustrated in FIG. 1, the storage system according to the first embodiment includes an operation management server 1, a storage device 2, an operation terminal 3, and a business server 4. In FIG. 1, the single storage device 2 is illustrated; however, the number of the storage devices 2 is not limited. Furthermore, only the single business server 4 is illustrated; however, the number of the business servers 4 is not also limited.

The operation terminal 3 is connected to the operation management server 1 via a network. The operation terminal 3 sends an instruction of a process to be performed on the storage device 2 to the operation management server 1. Furthermore, the operation terminal 3 displays, for example, a message sent from the operation management server 1 on a monitor and notifies an operator of the message. Furthermore, the operation terminal 3 displays, on the monitor, an input screen in response to an instruction received from a display control unit 105 in the operation management server 1, which will be described later.

The operation management server 1 operates and manages the storage device 2. The operation management server 1 executes a Quality of Service (QoS) control program and a storage management program. The operation management server 1 corresponds to an example of a "storage management device".

Specifically, the operation management server 1 performs QoS control in the storage device 2. The QoS mentioned here is a performance setting function that is used for the storage device 2 to maintain the stable performance and that adjusts a bandwidth of a volume, the distribution ratio of disks, or the like, which will be described later. Furthermore, the operation management server 1 controls the storage device 2 in accordance with a command that is input from the operation terminal 3. For example, the operation management server 1 instructs the storage device 2 to configure the RAID that is input from the operation terminal 3.

In response to an instruction received from an application that is running on the business server 4, the storage device 2 reads or writes data by using the QoS. Furthermore, in response to an instruction received from the operation management server 1 indicating the adjustment of the bandwidth of a volume, the distribution ratio of the disks, or the like, the storage device 2 controls the QoS.

The business server 4 executes a business application. When the business server 4 executes the application, the business server 4 reads or writes data from or to the storage device 2. The application executed by the business server 4 is not particularly limited as long as the application that sends and receives data to and from the storage device 2.

Figure 2:
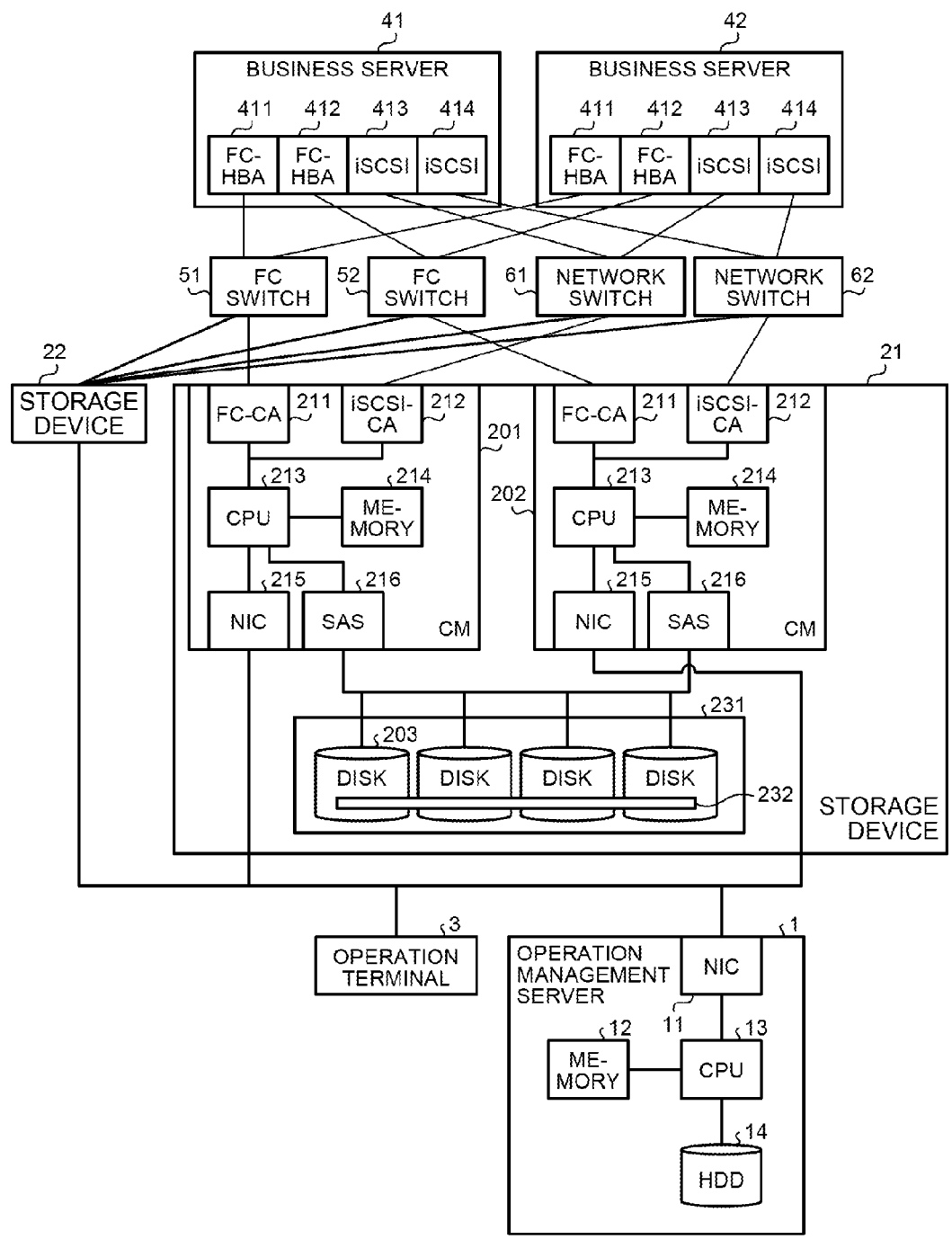
FIG. 2 is a schematic diagram illustrating the hardware configuration of the storage system.

FIG. 2 is a schematic diagram illustrating the hardware configuration of the storage system. FIG. 2 illustrates the state in which storage devices 21 and 22 are arranged as the storage device 2. Furthermore, FIG. 2 illustrates the state in which business servers 41 and 42 are arranged as the as the business server 4.

The business server 4 includes fiber channel-host bus adapters (FC-HBAs) 411 and 412 and internet small computer system interfaces (iSCSIs) 413 and 414. In the first embodiment, the number of the FC-HBAs 411 and 412 is two; however, an arbitrary number of FC-HBAs may also be installed in the business server 4. Furthermore, the number of the iSCSIs 413 and 414 is two; however, an arbitrary number of iSCSIs may also be installed in the business server 4.

The FC-HBAs 411 and 412 are communication interfaces for data communication using a fiber channel. The FC-HBAs 411 and 412 are connected to FC switches 51 and 52, respectively.

The iSCSIs 413 and 414 are communication interfaces for data communication conforming to the iSCSI standard. The iSCSIs 413 and 414 are connected to network switches 61 and 62, respectively.

The FC switches 51 and 52 relay communication between the storage device 2 and the business server 4 performed by using fiber channels. The FC switches 51 and 52 connect the FC-HBAs 411 and 412 to FC-channel adapters (CAs) 211, respectively.

The network switches 61 and 62 relay communication between the storage device 2 and the business server 4 performed by using iSCSI. The network switches 61 and 62 connect the iSCSIs 413 and 414 to iSCSI-CAs 212, respectively.

The storage device 2 includes controller modules (CMs) 201 and 202 and disks 203.

The CMs 201 and 202 have the same configuration. Accordingly, in the following, a description will be given of the CM 201 as an example.

The CM 201 includes the FC-CA 211, the iSCSI-CA 212, a central processing unit (CPU) 213, a memory 214, a network interface card (NIC) 215, and a serial attached SCSI (SAS) 216.

The FA-CA 211, the iSCSI-CA 212, the memory 214, the NIC 215, and the SAS 216 are connected to the CPU 213.

The CPU 213 sends and receives data to and from the business server 4 via the FC-CA 211 and the iSCSI-CA 212.

Furthermore, the CPU 213 performs the reading and the writing of data from and to the disks 203 via the SAS 216.

Furthermore, the CPU 213 performs communication between the operation terminal 3 and the operation management server 1 via the NIC 215. For example, when the CPU 213 receives an instruction to adjust the bandwidth, which will be described later, from the operation management server 1, the CPU 213 adjusts the bandwidth of the disks 203 in accordance with the instruction.

A plurality number of the disks 203 is mounted on the storage device 2. Furthermore, disks with different speeds are included in the disks 203. In the first embodiment, three types of disks with different speeds are present: high speed disks, medium speed disks, and low speed disks. For example, for the disks according to the first embodiment, SSDs that are high speed disks, Online storage that is a medium speed disk, and Nearline storage that is a low speed disk are included.

In FIG. 2, a RAID group 231 is constructed by the plurality number of the disks 203 with different speeds. Furthermore, physical storage areas of the RAID group 231 are allocated to the storage areas in a volume 232.

The volume 232 is a logical volume accessed by the business server 4. As physical allocation destination of the volume 232, one of the disks 203 with three different speeds or a combination thereof may also be included. For the combination, all of the three types of disks may also be included or two types of disks may also be included. Then, for the volume 232, by changing the distribution ratio for each type of the disks 203, performance adjustment is performed. Namely, the volume 232 is automatically tired. Furthermore, each of the volumes 232 is divided into sections for each type of disks.

Here, the various types of the disks 203 included in the automatically tiered volume 232 are divided into areas with a fixed size. In a description below, the area with the fixed size is referred to as a "chunk". For The automatically tiered volumes 232, the performance is adjusted by allocating chunks the number of which is associated with the distribution ratio from the various types of the disks 203.

In the following, a description will be given of the writing and the reading of data performed by the CPU 213. The CPU 213 receives, from a business application running on the business server 4, a read command that is an instruction to read data or a write command that is an instruction to write data. At this point, the read command or the write command is sent to the CPU 213 via, for example, the port of the FC switch 51 and the port of the FC-CA 211. Then, the CPU 213 performs the reading or the writing of data from or to the volume 232 of the disks 203 in accordance with the received command. At this point, the data is written to or read from the volume 232 in accordance with the configuration of the RAID group. Furthermore, a description has been given of a case in which the CPU 213 in the CM 201 reads and writes data; however, the same process is also performed in the CPU 213 in the CM 202.

Namely, in data transfer in which data is written or read, contention occurs in a port of the FC switch 51, in a port of the FC-CA 211 or the iSCSI-CA 212, in the CPU 213 that functions as the processing processor that performs a process on the data, and in the RAID group 231. In a description below, the port of the FC switch 51, the port of the FC-CA 211 or the iSCSI-CA 212, the CPU 213 that functions as the processing processor that performs a process on the data, and the RAID group 231 may sometimes be collectively referred to as the "resources".

If contention occurs in each of the resources at the time of data transfer, the performance of the data transfer is decreased. Accordingly, in a transmission path that is used by a resource in which contention occur, by adjusting the bandwidth of the volume 232 that uses the transmission path, the contention occurring in the resource can be eliminated and thus the performance of the data transfer can be maintained in a high state.

Furthermore, the performance of the volume 232 varies depending on the distribution ratio for each type of the disks 203. Thus, by adjusting the distribution ratio for each type of the disks 203 in the volume 232, it is possible to ensure the desired performance of the volume 232. Accordingly, in the following, adjustment of the bandwidth of the volume 232 and adjustment of the distribution ratio for each type of the disks 203 will be described.

The operation management server 1 includes a NIC 11, a memory 12, a CPU 13, and a hard disk drive (HDD) 14. The NIC 11, memory 12, and the HDD 14 are connected to the CPU 13 via a bus.

Figure 3:
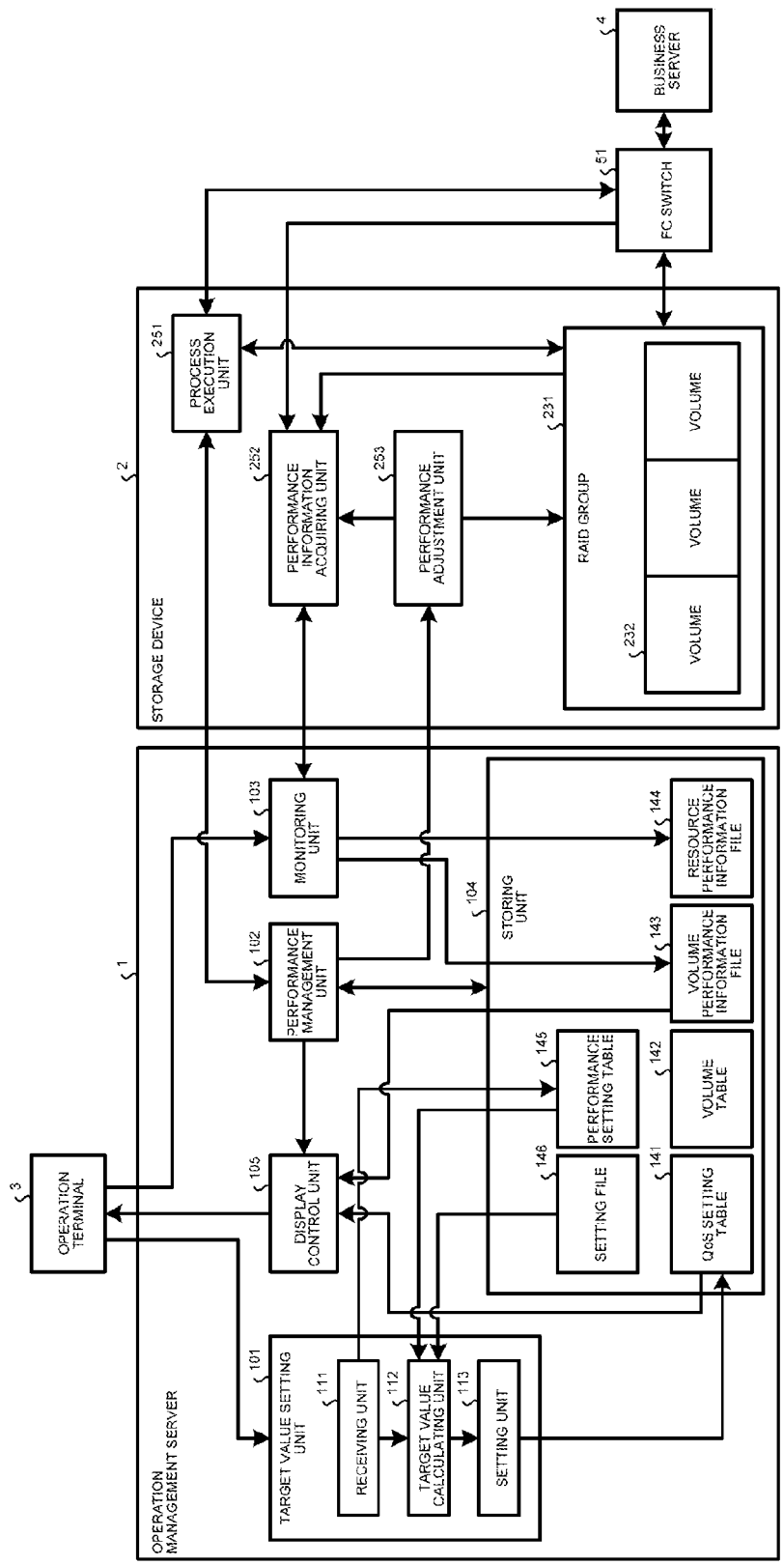
FIG. 3 is a block diagram illustrating an operation management server and a storage device according a first embodiment.

FIG. 3 is a block diagram illustrating an operation management server and a storage device according a first embodiment. The operation management server 1 includes a target value setting unit 101, a performance management unit 102, a monitoring unit 103, a storing unit 104, and the display control unit 105. Furthermore, the storage device 2 includes a process execution unit 251, a performance information acquiring unit 252, and a performance adjustment unit 253.

The storing unit 104 has a predetermined information storage area that stores therein each of a QoS setting table 141, a volume table 142, a volume performance information file 143, a resource performance information file 144, a performance setting table 145, and a setting file 146. Furthermore, information storage area does not need to store therein each of the tables themselves but may also store therein information that is used to create a table at the time of control. The function of the storing unit 104 is implemented by, for example, the HDD 14 illustrated in FIG. 2.

Figure 4:
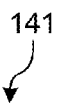
FIG. 4 is a schematic diagram illustrating an example of a QoS setting table.

FIG. 4 is a schematic diagram illustrating an example of a QoS setting table. The volume identification information is information for uniquely specifying the volumes 232. In the first embodiment, in the QoS setting table 141, volume identification information, the target response time, and the bandwidth are registered in an associated manner.

In the first embodiment, the volume identification information is represented by both the number allocated to each of the storage devices and the number allocated to each of the volumes. For example, if it is assumed that the storage device 21 illustrated in FIG. 2 is No. 1 and the storage device 22 illustrated in FIG. 2 is No. 2, "Storage=1, Vol No=1" indicates the volume 232 in the storage device 21 with the volume number of 1.

Furthermore, the target response time mentioned here is a response time targeted by a volume that includes therein the associated volume identification information. If the target response time is not set, in the column of the target response time, the symbol that represents a blank column is illustrated.

Furthermore, the bandwidth is a bandwidth that is set in the volume that stores therein the associated volume identification information. In FIG. 4, the bandwidth is represented by two types: an amount of data per second (MB Per Second) that represents the throughput and the number of read/write operations (Input Output Per Second: IOPS).

The volume table 142 indicates the resource used by each of the volumes 232. Namely, the volume 232 indicated by the volume identification information uses the processing processor, the port number, the switch port, and the RAID group associated in the volume table 142.

Because the transmission path used by each of the volumes 232 is previously determined, the resource that is to be used and that is arranged on the subject transmission path can be previously specified. Consequently, in the volume table 142, the resources associated with the respective volumes are previously registered.

In the volume performance information file 143, information indicating the performance of the actual measurement of each of the volumes 232 is registered. In the first embodiment, in the volume performance information file 143, in addition to the performance measurement date and time, the volume identification information, the actual measurement response time, the actual measurement throughput, the actual measurement IOPS, the actual measurement cache hit rate, and the actual measurement delay time are registered in an associated manner. In the description below, the volume identification information, the actual measurement response time, the actual measurement throughput, the actual measurement IOPS, the actual measurement cache hit rate, and the actual measurement delay time may sometimes be collectively referred to as "performance information on a volume".

The actual measurement response time is the response time measured when data is read from and written to the volume 232 that includes therein the associated volume identification information. The actual measurement throughput is the throughput measured when data is read from and written to the volume 232 that includes therein the associated volume identification information. The actual measurement IOPS is the IOPS measured when data is read from and written to the volume 232 that includes therein the associated volume identification information. The actual measurement cache hit rate is the cache hit rate measured when data is read from and written to the volume 232 that includes therein the associated volume identification information. The actual measurement delay time is the delay time measured when data is read from and written to the volume 232 that includes therein the associated volume identification information.

The resource performance information file 144 indicates the actual performance of each of the resources. In the first embodiment, in the resource performance information file 144, in addition to the performance measurement date and time, the resource type, the resource identification information, and the busy rate are registered in an associated manner.

The resource identification information is information for uniquely specifying the resources. The resource type is the type of the resources specified by the resource identification information. The busy rate is a load ratio of the resource specified by the resource identification information.

Figure 5:
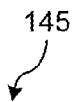
FIG. 5 is a schematic diagram illustrating an example of a performance setting table.

FIG. 5 is a schematic diagram illustrating an example of a performance setting table. The performance setting table 145 is a table that is used to store the performance level that represents the target performance of each of the volumes 232 specified by an operator. Here, the performance level specified by the operator is information indicated by dividing the performance of each of the volumes 232 into predetermined levels. Furthermore, the performance level is the adjustment target for the adjustment of the bandwidth of the volumes 232 performed by the storage management device 1. In the first embodiment, the performance level is divided into three stages: the high performance, the medium performance, and the low performance. The performance setting table 145 stores therein the performance level specified by each of the volumes 232 such that each of the volumes 232 is associated with the identification information of each of the volumes 232. However, from among the volumes 232, there is a volume in which the performance level is not specified. In the column associated with the subject volume 232, information about the performance level is not stored.

Figure 6:
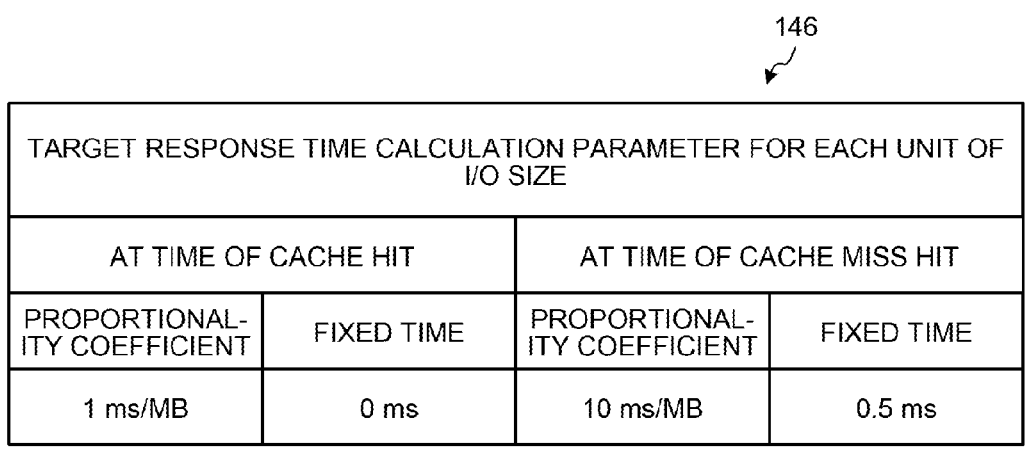
FIG. 6 is a schematic diagram illustrating an example of a setting file.

FIG. 6 is a schematic diagram illustrating an example of a setting file. The setting file 146 is a file that stores therein a parameter that is used to calculate a target value of the performance of each of the volumes 232. In the first embodiment, the target response time at the time of cache hit for each unit of the input/output (IO) size and the target response time at the time of cache miss hit for each unit of the IO size are stored in the setting file 146. Here, the response time is classified into the time proportional to the IO size, such as the reading/writing time, data transfer time, or the like, and the time that is not proportional to the IO size, such as a seek time of a disk, a processing time of a processing processor, a waiting time, or the like. The time proportional to the IO size is preferably calculated according to the IO size. In contrast, the time that is not proportional to the IO size can previously calculated as a fixed value.

Thus, in the first embodiment, as a parameter that is used to calculate the target response time, a proportionality coefficient that is used to calculate the time proportional to the IO size of the target response time and a constant that is not proportional to the IO size are registered in the setting file 146.

Specifically, as illustrated in FIG. 6, in the setting file 146 described in the first embodiment, as the target response time calculation parameter at the time of cache hit for each unit of the IO size, the proportionality coefficient and the fixed time are registered. Furthermore, for the target response time for each unit of the IO size at the time of cache miss hit, the proportionality coefficient and the fixed time are also registered. Hereinafter, a proportionality coefficient at the time of cache hit that is the target response time calculation parameter for each unit of the IO size registered in the setting file 146 is referred to as a "proportionality coefficient at the time of cache hit". Furthermore, the fixed time at the time of cache hit that is the target response time calculation parameter for each unit of the IO size registered in the setting file 146 is referred to as "fixed time at the time of cache hit". Furthermore, the proportionality coefficient at the time of cache miss hit that is the target response time calculation parameter for each unit of the IO size registered in the setting file 146 is referred to as a "proportionality coefficient at the time of cache miss hit". Furthermore, the fixed time at the time of cache miss hit that is the target response time calculation parameter for each unit of the IO size registered in the setting file 146 is referred to as "fixed time at the time of cache miss hit".

Here, if the IO size is large, the response time is increased. When adjustment of the target value using the IO size is not performed, if the measurement result obtained when the IO size is large is used, the response time is increased and, even if the target performance is "low performance", a lot of bands are also ensured. In contrast, if the measurement result obtained when the IO size is small is used, because the response time is measured as a short time period, even if the performance level is "high performance", only the narrow bands are ensured. Furthermore, the response time differs between at the time of cache hit and at the time of cache miss hit. Thus, if the measurement result obtained when the cache hit rate is high is used, because the response time is measured as a short time period unless adjustment of the target value using the cache hit rate is performed, only narrow bands are ensured also in a case in which the performance level is "high performance". Accordingly, as indicated by the setting file 146, the IO size and the cache hit rate are used as the parameters for calculating the target value.

Here, in the first embodiment, the parameter that is used to calculate the target response time is indicated in the setting file 146; however, the method or holding the parameters that are used to calculate the target response time is not limited thereto. For example, a coefficient or a constant are stored in a target value calculating unit 112, which will be described later, and, in the setting file 146, only a performance level is defined.

A description will be continued here by referring back to FIG. 3. The display control unit 105 receives, from the operation terminal 3, a request for setting a target value. The display control unit 105 stores therein the type of the performance levels. Then, the display control unit 105 displays an input screen of the target performance on the monitor of the operation terminal 3. By using an input device, such as a keyboard or the like, the operator inputs identification information on the volume 232 in order to set the performance level and also inputs a specification of a target level.

Furthermore, the display control unit 105 acquires the target response time from the QoS setting table 141 and displays the acquired target response time on, for example, the monitor in the operation terminal 3. Furthermore, the display control unit 105 acquires the actual measurement response time from the volume performance information file 143 and displays the acquired actual measurement response time on, for example, the monitor in the operation terminal 3.

The target value setting unit 101 includes a receiving unit 111, the target value calculating unit 112, and a setting unit 113. In a description below, a description will be given of a case in which response time is used as the index of the performance.

The receiving unit 111 receives, from the operation terminal 3, the performance level of the volume 232 that is input by the operator. The receiving unit 111 registers, in the performance setting table 145, the target response time of the specified volume 232. Then, the receiving unit 111 instructs the target value calculating unit 112 to calculate a target value. Hereinafter, the volume 232 in which the target performance (here, the performance level) is set is referred to as a "target set volume". Furthermore, the volume in which the target performance is not set is referred to as a "non-target set volume".

The target value calculating unit 112 receives, from the receiving unit 111, an instruction to calculate a target value. Then, the target value calculating unit 112 acquires the performance level for each target set volume 232 from the performance setting table 145. Furthermore, the target value calculating unit 112 acquires, from the setting file 146, the target response time for each unit of the IO size at the time of cache hit associated with the acquired performance level and the target response time for each unit of the IO size at the time of cache miss hit associated with the acquired performance level.

Here, the target value calculating unit 112 previously stores therein a fixed distribution ratio, for each type of the disks, that is used as the initial value for the calculation. For example, in the first embodiment, the target value calculating unit 112 stores therein the fixed distribution ratio in which the distribution ratio of an SSD that is a high speed disk is set to 100% and the distribution ratio of each of Online storage that is a medium speed disk and Nearline storage that is a low speed disk is set to 0%. Then, the target value calculating unit 112 calculates, from the stored fixed distribution ratio, a hit rate of the high speed disk, a hit rate of the medium speed disk, and a hit rate of the low speed disk. The hit rate of each of the disks is indicated by a ratio on the assumption that a case of all processes being hit is set to 1. Namely, the sum of the hit rate of the high speed disk, the hit rate of the medium speed disk, and the hit rate of the low speed disk becomes 1. Here, in the first embodiment, because the distribution ratio of the high speed disk is 100% and hit always occurs in the high speed disk, the target value calculating unit 112 calculates the hit rate of the high speed disk as 1. Then, the target value calculating unit 112 calculates the hit rate of each of the medium speed disk and the low speed disk as 0.

Here, in the first embodiment, for the fixed distribution ratio, the distribution ratio of the SSD that is the high speed disk is set to 100% and the distribution ratio of each of the Online storage that is the medium speed disk and the Nearline storage that is the low speed disk is set to 0%; however, the fixed distribution ratio is not limited thereto. For example, for the fixed distribution ratio, the distribution ratio of each of the SSD that is the high speed disk and the Online storage that is the medium speed disk may also be set to 0% and the distribution ratio of the Nearline storage that is the low speed disk may also be set to 100%. Furthermore, a value other than 100% and 0% may also be set as the distribution ratio. In such a case, the target value calculating unit 112 calculates a hit rate of various kinds of disks by using, for example, the following calculation.

For example, it is conceivable to use a function, as an access distribution function, that represents the hit rates by being associated with values, listed in descending order, of the ratios of each of the access frequencies with respect to all the disks. Hereinafter, values, listed in descending order, of the ratios of each of the access frequencies with respect to all the disks are referred to as "access frequency ratios". Namely, the access frequency function is a function in which, if the ratio of access frequency is x %, the hit rate is obtained as y %.

Then, if pieces of data are allocated in the order the hit rate is high, i.e., in the order of the high speed disk, the medium speed disk, and the low speed disk, distribution ratio of the high speed disk matches the ratio of the access frequency. Namely, the hit rate of the high speed disk matches the value obtained by substituting the distribution ratio of the high speed disk into the access distribution function. Furthermore, the hit rate of the medium speed disk corresponds to the value obtained by subtracting the hit rate of the high speed disk from the value obtained by substituting the sum of the distribution ratio of each of the medium speed disk and the high speed disk into the distribution function. Furthermore, the low speed disk hit rate corresponds to the value obtained by subtracting the hit rate of the high speed disk and the hit rate of the medium speed disk from the value obtained by substituting the sum of the distribution ratio of each of the low speed disk, the medium speed disk, and the high speed disk (i.e., 100%) into the distribution function.

Then, the target value calculating unit 112 calculates a temporary target response time by using Equation 1 and Equation 2 below. The target response time mentioned here corresponds to an example of "a first target value". Equation 2 is an equation that represents the term of $\{tncache \times (T \div I) +$ Cncache} in Equation 1 by using the cache hit rate of each type of disks.

$$\text{target response time} = R\text{cache} \times \{t\text{cache} \times (T \div I) + C\text{cache}\} + (1 - R\text{cache}) \times \{tn\text{cache} \times (T \div 1) + Cn\text{cache}\} \quad (1)$$

Rcache: cache hit rate
tcache: proportionality coefficient of the target response time for each unit of IO size at the time of cache hit
Ccache: constant of the target response time at the time of cache hit
tncache: proportionality coefficient of the target response time for each unit of IO size at the time of cache miss hit
Cncache: constant of the target response time at the time of cache miss hit
T: actual measurement throughput
I: actual measurement IOPS $$tn\text{cache} \times (T \div I) + Cn\text{cache} = R\text{high} \times \{t\text{high} \times (T \div I) + C\text{high}\} + R\text{middle} \times \{t\text{middle} \times (T \div I) + C\text{middle}\} + R\text{low} \times \{t\text{low} \times (T \div I) + C\text{low}\} \quad (2)$$

Rhigh: cache hit rate of a high speed disk
thigh: proportionality coefficient of the target response time of a high speed disk for each unit of IO size at the time of cache hit
Chigh: constant of the target response time of a high speed disk at the time of cache hit
Rmiddle: cache hit rate of a medium speed disk
tmiddle: proportionality coefficient of the target response time of a medium speed disk for each unit of IO size at the time of cache hit
Cmiddle: constant of the target response time of a medium speed disk at the time of cache hit
Rlow: cache hit rate of a low speed disk
tlow: proportionality coefficient of the target response time of a low speed disk for each unit of IO size at the time of cache hit
Clow: constant of the target response time of a low speed disk at the time of cache hit
where, Rhigh+Rmiddle+Rlow=1 is given.

Furthermore, if a disk with a type that is not included in the target set volume targeted for calculating a target value is present, the target value calculating unit 112 calculates a hit rate of the subject disk with that type as 0.

Furthermore, the target value calculating unit 112 manages the performance ratio of each of the performance levels in accordance with the distribution ratio for each type of the disks. Here, the target value calculating unit 112 manages the performance ratio of each of the performance levels, which indicates the configuration in which the target value calculating unit 112 can freely acquire the performance ratio of each of the performance levels. For example, the target value calculating unit 112 may also store therein the performance ratio of each of the performance levels or the target value calculating unit 112 may also acquire the performance ratio of each of the performance levels stored in the memory held by the target value calculating unit 112 itself or managed by the target value calculating unit 112. In the first embodiment, a description will be given of a case in which the target value calculating unit 112 stores therein the performance ratio of each of the performance levels.

Specifically, the target value calculating unit 112 stores therein the performance ratio of each of the performance levels obtained when the response time of the fixed distribution ratio is set to 1. For example, if the distribution ratio of the high speed disk is 100% as the fixed distribution ratio, the target value calculating unit 112 stores therein the performance ratio of each of the performance levels as "high performance:medium performance:low performance=1.2:9:30". In a description below, the performance ratios of the performance levels, i.e., the high performance, the medium performance, and the low performance, are simply referred to as a "performance ratio".

In the following, for example, a description will be given of a case in which the fixed distribution ratio is another value. For example, if the distribution ratio of the low speed disk is set to 100% as the fixed distribution ratio, for the performance ratio, the performance ratio of each of the high performance and the medium performance is less than 1 such as "high performance:medium performance:low performance=0.12:0.9:3".

The target value calculating unit 112 acquires the value of the performance ratio according to the performance level specified by an operator. Then, the target value calculating unit 112 calculates a target response time of the volume that is targeted for the calculation by multiplying the acquired ratio by the calculated temporary target response time. The target response time calculated here corresponds to an example of the "second target value".

Then, the target value calculating unit 112 sends the calculated target response time of each of the target set volumes to the setting unit 113.

The setting unit 113 receives the target response time of each of the target set volumes from the target value calculating unit 112. Then, the setting unit 113 registers the target response time of each of the target set volumes in the QoS setting table 141.

The monitoring unit 103 receives, from the operation terminal 3, an instruction from an operator indicating the collection of the performance to be started. Then, the monitoring unit 103 periodically receives, from the performance information acquiring unit 252, performance information on a volume and a resource and a delay time of each of the volumes 232. Then, the monitoring unit 103 writes the received performance information on each of the volumes 232 and the delay time to the volume performance information file 143. Furthermore, the monitoring unit 103 writes the received performance information on the resource to the resource performance information file 144.

The performance management unit 102 specifies target set volumes from the QoS setting table 141. Then, the performance management unit 102 selects a single target set volume from among the specified target set volumes. Hereinafter, the selection of the target set volume is referred to as "first selection".

Then, the performance management unit 102 acquires, from the volume table 142, the information on the resources that are used by the target set volume selected at the first selection. Furthermore, the performance management unit 102 acquires the busy rate of each of the acquired resources from the resource performance information file 144. Then, the performance management unit 102 specifies the resource with the highest busy rate from among the resources used by the target set volume selected at the first selection.

The performance management unit 102 specifies, by using the volume table 142, the volumes 232 that share the resource that has the highest busy rate from among the resources and that is used by the target set volume selected at the first selection. The specified volumes 232 are referred to as "shared volumes".

The performance management unit 102 selects a single target set volume from among the shared volumes. Hereinafter, selection of the target set volume is referred to as "second selection". Then, the performance management unit 102 acquires, from the volume performance information file 143, the actual measurement response time of the target set volume obtained at the second selection. Furthermore, the performance management unit 102 acquires, from the QoS setting table 141, the target response time of the target set volume obtained at the second selection. Then, the performance management unit 102 compares the actual measurement response time of the target set volume obtained at the second selection with the target response time thereof.

If the target response time is smaller than the actual measurement response time, the performance management unit 102 acquires, from the volume performance information file 143, the delay time of the target set volume obtained at the second selection. Furthermore, the performance management unit 102 acquires, from the QoS setting table 141, the current band limit width of the target set volume obtained at the second selection.

Then, if the band limit width is the greatest or the delay time is 0, the performance management unit 102 changes the distribution ratio such that the number of high speed disks allocated to the target set volume obtained at the second selection is increased.

Furthermore, if the band limit width is the smallest, the performance management unit 102 changes the distribution ratio such that the number of low speed disks allocated to the target set volume obtained at the second selection is increased.

In the following, calculation of the distribution ratio performed by the performance management unit 102 will be described in detail. The performance management unit 102 establishes an approximate expression that is used to calculate an estimate response time. The approximate expression can be represented by, for example, Equation 3 below.

$$RT_{avg} = RT_H \times HR_H + RT_M \times HR_M + RT_L \times HR_L \quad (3)$$

$RT_{avg}$: average response time
$RT_H$: response time of a high speed disk
$HR_H$: hit rate of a high speed disk
$RT_M$: response time of a medium speed disk
$HR_M$: hit rate of a medium speed disk
$RT_L$: response time of a low speed disk
$HR_L$: hit rate of a low speed disk As an access distribution function that is used to change the distribution ratio to the hit rate, the performance management unit 102 previously stores therein a function that represents the hit rate by being associated with values, listed in descending order, of the ratios of each of the access frequencies to all the disks. In this case, the average response time can be represented by Equation 4 below by using the distribution ratio of each disk.

$$RT_{avg} = RT_H \times f(AR_H) + RT_M \times \{f(AR_H + AR_M) - f(AR_H)\} + RT_L \times \{100 - f(AR_H + AR_M)\} \quad (4)$$

$f(x)$: access distribution function
$AR_H$: distribution ratio of a high speed disk
$AR_M$: distribution ratio of a medium speed disk
$AR_L$: distribution ratio of a low speed disk If Equation 4 is transformed, Equation 5 below can be obtained.

$$RT_{avg} = RT_L + (RT_H - RT_L) \times \{f(AR_H) + f(AR_H)\} + (RT_H - RT_M) \times f(AR_H + AR_M) \quad (5)$$

Furthermore, the performance management unit 102 previously stores therein the representative value of the response time for each type of the disks 203. Here, the response time of the disks 203 depends on the type of the disks 203 and the type and the size of I/O. From among these, for the I/O size, in a process that needs a high-speed response time, a response time is often issued in a small size. Thus, the performance management unit 102 stores therein, as a representative value, the value of the average response time needed when small I/O size is used.

The performance management unit 102 acquires the information on the RAID configuration of the selected volume from the volume table 142. Then, the performance management unit 102 acquires, in accordance with the RAID configuration of the selected volume, the response time at the time of Read for each type of the disks 203 and the response time at the time of Write for each type of the disks 203.

At this point, for the type of I/O that is to be used, the ratio thereof varies depending on business. Accordingly, the performance management unit 102 previously holds information on the ratio of Read/Write according to the business.

The performance management unit 102 acquires, from the process execution unit 251 in the storage device 2, the content of the business in which data is read from and written to the selection volume. Then, the performance management unit 102 acquires, from the information on the ratio of Read/Write, the ratio of Read/Write of I/O according to the acquired business. Then, the response time for each type of the disks 203 in the selected volume is calculated by using Equation 6.

$$\text{response time} = \text{Read response time} \times (\text{Read ratio}/10) + \text{Write response time} \times (\text{Write ratio}/10) \quad (6)$$

Then, for the distribution ratio that can be used for the access distribution function, the performance management unit 102 creates a combination of distribution ratios for each type of the disks 203.

Then, average response time is calculated by substituting the calculated response time for each type of the disks 203 and the created distribution ratio into Equation 3. The obtained average response time corresponds to the estimate response time that is calculated when the various types of the disks 203 are distributed by using the combination of that distribution ratio.

The performance management unit 102 repeatedly calculates an estimate response time by changing the combination of the distribution ratio. Then, the performance management unit 102 specifies the combination of the distribution ratio closest to the target response time that is set in the selection volume.

The performance management unit 102 creates a command that is used to set the specified distribution ratio and outputs the created command to the performance adjustment unit 253 in the storage device 2.

In the following, by referring back to FIG. 3, a description will be given of the continuation of the process performed by the performance management unit 102. If the band limit width is not in the narrowest state nor in the widest state and if the delay time is other than 0, the performance management unit 102 reserves an expansion of the bandwidth of the target set volume obtained at the second selection. Furthermore, the performance management unit 102 reserves a reduction of the bandwidth of the non-target set volume from among the shared volumes.

In contrast, if the target response time is greater than the actual measurement response time, the performance management unit 102 reserves a reduction of the bandwidth of the target set volume obtained at the second selection. Furthermore, the performance management unit 102 reserves an expansion of the bandwidth of the non-target set volume from among the shared volumes.

The performance management unit 102 performs, for all of the set volumes included in the shared volumes, a reservation of the second selection of the target set volume from among the shared volumes and a reservation of the adjustment of the bandwidth thereafter.

Furthermore, for all of the target set volumes, the performance management unit 102 performs the first selection, specification of the shared volumes thereafter, the second selection, and a reservation of the adjustment of the bandwidth.

Then, the performance management unit 102 decides the adjustment of the bandwidth of each of the volumes 232 on the basis of the reservation of the adjustment performed on each of the volumes 232. For example, the performance management unit 102 calculates the sum of the adjustment of each of the volumes 232 by, using the initial value as 0, adding 1 if the reservation indicates an expansion, and subtracting 1 if the reservation indicates a reduction. Then, if the result of the sum is a positive value, the performance management unit 102 decides to expand the bandwidth of the subject volume 232. In contrast, if the result of the sum is a negative value, the performance management unit 102 decides to reduce the bandwidth of the subject volume 232.

Then, the performance management unit 102 notifies the performance adjustment unit 253 of the decided adjustment of the bandwidth of each of the volumes 232. Specifically, the performance management unit 102 sends, to the performance adjustment unit 253 in the storage device 2, a setting command for increasing or reducing the bandwidth of each of the volumes 232.

The functions performed by the target value setting unit 101, the performance management unit 102, and the monitoring unit 103 are implemented by, for example, the CPU 13 and the memory 12 illustrated in FIG. 2. For example, the HDD 14 stores therein various kinds of programs that are used to implement the functions performed by the target value setting unit 101, the performance management unit 102, and the monitoring unit 103. Then, the CPU 13 reads the various kinds of programs from the HDD 14; loads the processes that implement the functions performed by the target value setting unit 101, the performance management unit 102, and the monitoring unit 103 in the memory 12; and executes the processes.

The process execution unit 251 receives, from an application executed by the business server 4, a request for reading and writing data from and to the volume 232. Then, the process execution unit 251 reads and writes the data from and to the volume 232 in accordance with the request. Furthermore, the process execution unit 251 acquires information about an application that issues a request for reading and writing data from and to the volume 232 and specifies the business content of that application. Then, the process execution unit 251 notifies the performance management unit 102 of the business content of the application that issues the request for reading and writing data with respect to the volume 232.

The performance information acquiring unit 252 receives, from the monitoring unit 103, an instruction to start collection of the performance. Then, the performance information acquiring unit 252 periodically acquires the performance information on each of the volumes 232 and sends the acquired information to the monitoring unit 103. Furthermore, the performance information acquiring unit 252 periodically acquires the performance information of each of the resources and sends the acquired information to the monitoring unit 103. Here, FIG. 3 illustrates a case, as an example of the acquisition of the performance information on the resources, in which the performance information is acquired from the RAID group 231 and the FC switch 51 by the performance information acquiring unit 252. Furthermore, the performance information acquiring unit 252 acquires a delay time of each of the volumes 232 and sends the acquired delay time to the monitoring unit 103.

The performance adjustment unit 253 receives the distribution ratio for each type of the disks 203 from the performance management unit 102. Then, the performance adjustment unit 253 allocates the volumes 232, in the order of the high speed disk, the medium speed disk, and the low speed disk, such that the received distribution ratio is satisfied. Then, the performance adjustment unit 253 performs a process of allowing, for example, frequently accessed data to be stored in a high speed disk, less frequently accessed data to be stored in a low speed disk, and the remaining data to be stored in a medium speed disk.

Furthermore, the performance adjustment unit 253 receives a setting command for expanding or reducing the bandwidth from the performance management unit 102. Then, the performance adjustment unit 253 expands or reduces the bandwidth of the volumes 232 specified by each of the setting commands in accordance with the specified setting commands.

The functions performed by the process execution unit 251, the performance information acquiring unit 252, and the performance adjustment unit 253 are implemented by, for example, the CPU 213 and the memory 214 illustrated in FIG. 2. For example, the memory 214 stores therein various kinds programs that are used to implement the functions performed by the process execution unit 251, the performance information acquiring unit 252, and the performance adjustment unit 253. Then, the CPU 213 reads the various kinds of programs from the memory 214; creates processes for implementing the functions performed by the process execution unit 251, the performance information acquiring unit 252, and the performance adjustment unit 253; and executes the processes.

Figure 7:
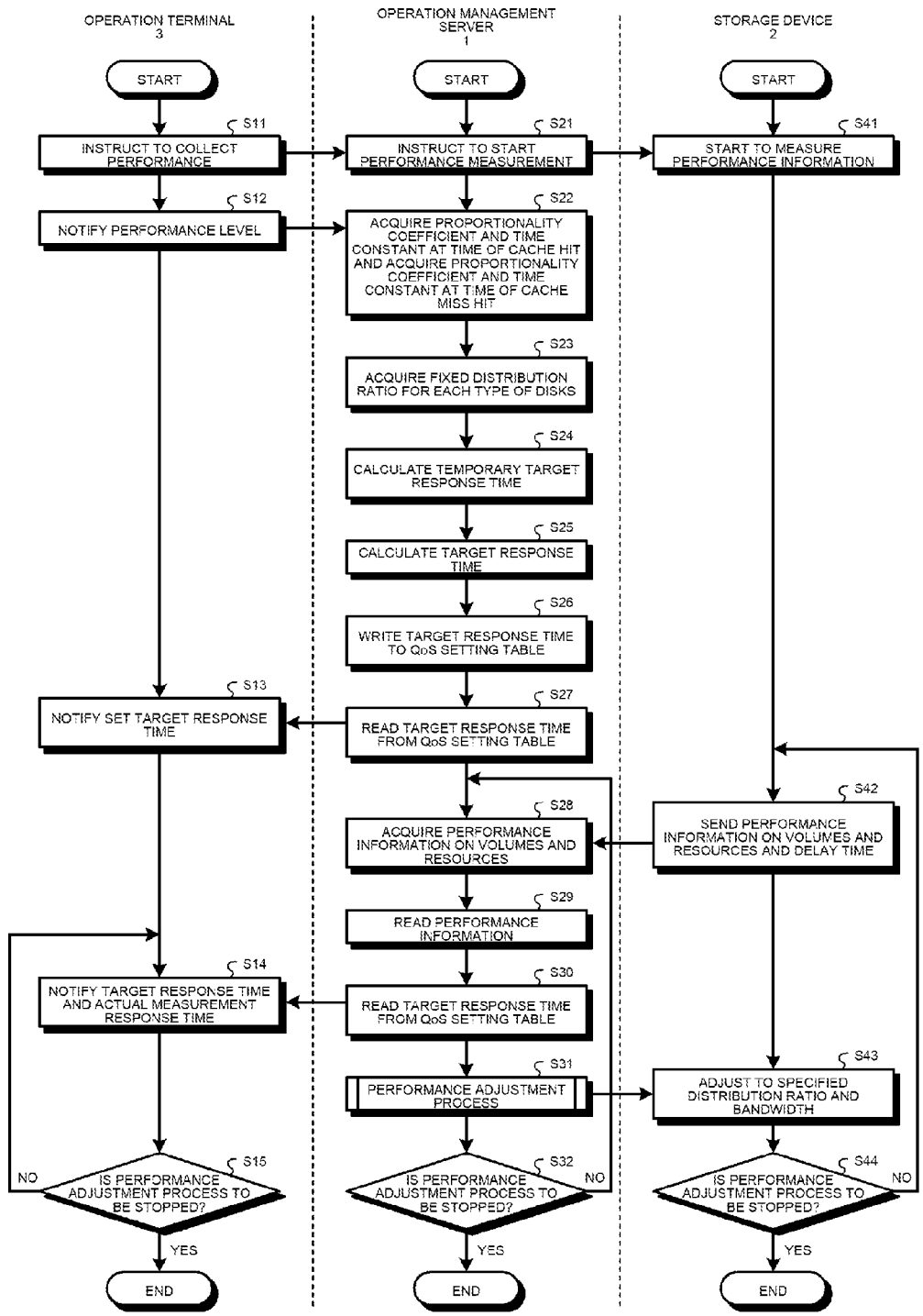
FIG. 7 is a flowchart illustrating the flow of a performance adjustment process performed in the storage system according to the first embodiment.

In the following, the flow of a performance adjustment process performed in the storage system according to the first embodiment will be described with reference to FIG. 7. FIG. 7 is a flowchart illustrating the flow of the performance adjustment process performed in the storage system according to the first embodiment. The flow on the left side illustrated in FIG. 7 indicates the process performed by the operation terminal 3. The flow illustrated in the middle indicates the process performed by the operation management server 1. The flow on the right side indicates the process performed by the storage device 2. The arrow that connects each flow indicates that an instruction or data is sent in the direction of the arrow.

In response to an instruction from an operator, the operation terminal 3 instructs the monitoring unit 103 in the operation management server 1 to collect the performance (Step S11).

Furthermore, in response to an instruction from the operator by using an input screen for a target value, the operation terminal 3 notifies the target value setting unit 101 in the operation management server 1 of the performance level (Step S12).

Then, the operation terminal 3 receives, from the display control unit 105, the information on the set target response time. Then, the operation terminal 3 notifies the operator of the set target response time by displaying the set target response time on the monitor or the like (Step S13). The operator checks the set target response time received from the notification.

Then, the operation terminal 3 receives the target response time and the actual measurement response time from the display control unit 105 in the operation management server 1. Then, the operation terminal 3 notifies the operator of the target response time and the actual measurement response time by displaying the time on the monitor or the like (Step S14). The operator checks a difference between the target response time and the actual measurement response time from the notification.

Then, the operation terminal 3 determines whether the performance adjustment process is to be stopped (Step S15). For example, if the operation terminal 3 receives an input of an instruction to stop the performance adjustment process from the operator, the operation terminal 3 determines to stop the performance adjustment process.

If the operation terminal 3 determines that the performance adjustment process is not to be stopped (No at Step S15), the operation terminal 3 returns to Step S14. In contrast, if the operation terminal 3 determines to stop the performance adjustment process (Yes at Step S15), the operation terminal 3 ends the performance adjustment process performed in the storage device 2.

In the following, the process performed by the operation management server 1 will be described. The monitoring unit 103 receives an instruction to start the performance measurement from the operation terminal 3. Then, the monitoring unit 103 instructs the performance information acquiring unit 252 in the storage device 2 to start the performance measurement (Step S21).

The receiving unit 111 receives a performance level from the operation terminal 3. Then, the receiving unit 111 writes the received performance level to the performance setting table 145. Then, the target value calculating unit 112 reads the performance level of each of the target set volumes from the performance setting table 145. Furthermore, the target value calculating unit 112 acquires a proportionality coefficient and a time constant at the time of cache hit for each performance level and acquires a proportionality coefficient and a time constant at the time of cache miss hit for each performance level (Step S22).

Furthermore, the target value calculating unit 112 acquires a fixed distribution ratio for each type of the disks 203 (Step S23).

Then, the target value calculating unit 112 calculates a temporary target response time of each of the target set volumes by using Equations 1 and 2 (Step S24).

Then, the target value calculating unit 112 multiplies the performance ratio according to the performance level specified to each of the target set volumes by the calculated temporary target response time and calculates a target response time of each of the target set volumes (Step S25).

Then, the target value calculating unit 112 writes the calculated target response time of each of the target set volumes to the QoS setting table 141 (Step S26).

Thereafter, the display control unit 105 reads the target response time of each of the target set volumes from the QoS setting table 141 and notifies the operation terminal 3 of the read target response time (Step S27).

The monitoring unit 103 acquires the performance information on the volumes and the resources (Step S28). Then, the monitoring unit 103 registers the performance information on the volumes in the volume performance information file 143 and registers the performance information on the resources in the resource performance information file 144.

The performance management unit 102 reads the performance information on the volumes and the resources from the volume performance information file 143 and the resource performance information file 144 (Step S29).

The performance management unit 102 and the display control unit 105 read the target response time from the QoS setting table 141 (Step S30). Furthermore, the performance management unit 102 and the display control unit 105 acquire the actual measurement response time from the volume performance information file 143. Then, the display control unit 105 sends the target response time and the actual measurement response time to the operation terminal 3.

Furthermore, the performance management unit 102 performs the performance adjustment process performed in the storage device 2 (Step S31). The performance adjustment process will be described in detail later.

The performance management unit 102 determines whether the performance adjustment process is to be stopped (Step S32). For example, if the performance management unit 102 receives, from an operator from the operation terminal 3, an instruction to stop the performance adjustment process, the performance management unit 102 determines that the performance adjustment process performed in the storage device 2 is to be stopped.

If the performance management unit 102 determines that the performance adjustment process is not to be stopped (No at Step S32), the performance management unit 102 returns to Step S28. In contrast, if the performance management unit 102 determines to stop the performance adjustment process (Yes at Step S32), the performance management unit 102 ends the performance adjustment of the storage device 2.

In the following, a process performed by the storage device 2 will be described. The performance information acquiring unit 252 receives an instruction to start the performance measurement from the monitoring unit 103 in the operation management server 1. Then, the performance information acquiring unit 252 starts the measurement of the performance information of each of the volumes 232 and the performance information of each of the resources (Step S41).

Then, the performance information acquiring unit 252 sends, to the performance management unit 102 in the operation management server 1, the acquired performance information on each of the volumes 232, the acquired performance information of each of the resources, and a delay time of each of the volumes 232 (Step S42).

Thereafter, in response to the instruction from the performance management unit 102 in the operation management server 1, the performance adjustment unit 253 changes the distribution ratio of the disks 203 and expands or reduces the bandwidth of the specified volumes 232 (Step S43).

The performance adjustment unit 253 determines whether the performance adjustment process is to be stopped (Step S44). For example, if the performance adjustment unit 253 receives an instruction to stop the performance adjustment process from the operator from the operation management server 1, the performance adjustment unit 253 determines that the performance adjustment process performed in the storage device 2 is to be stopped.

If the performance adjustment unit 253 determines that the performance adjustment process is not to be stopped (No at Step S44), the performance adjustment unit 253 returns to Step S42. In contrast, if the performance adjustment process determines that the performance adjustment process is to be stopped (Yes at Step S44), the performance adjustment unit 253 ends the process of the performance adjustment.

Figure 8:
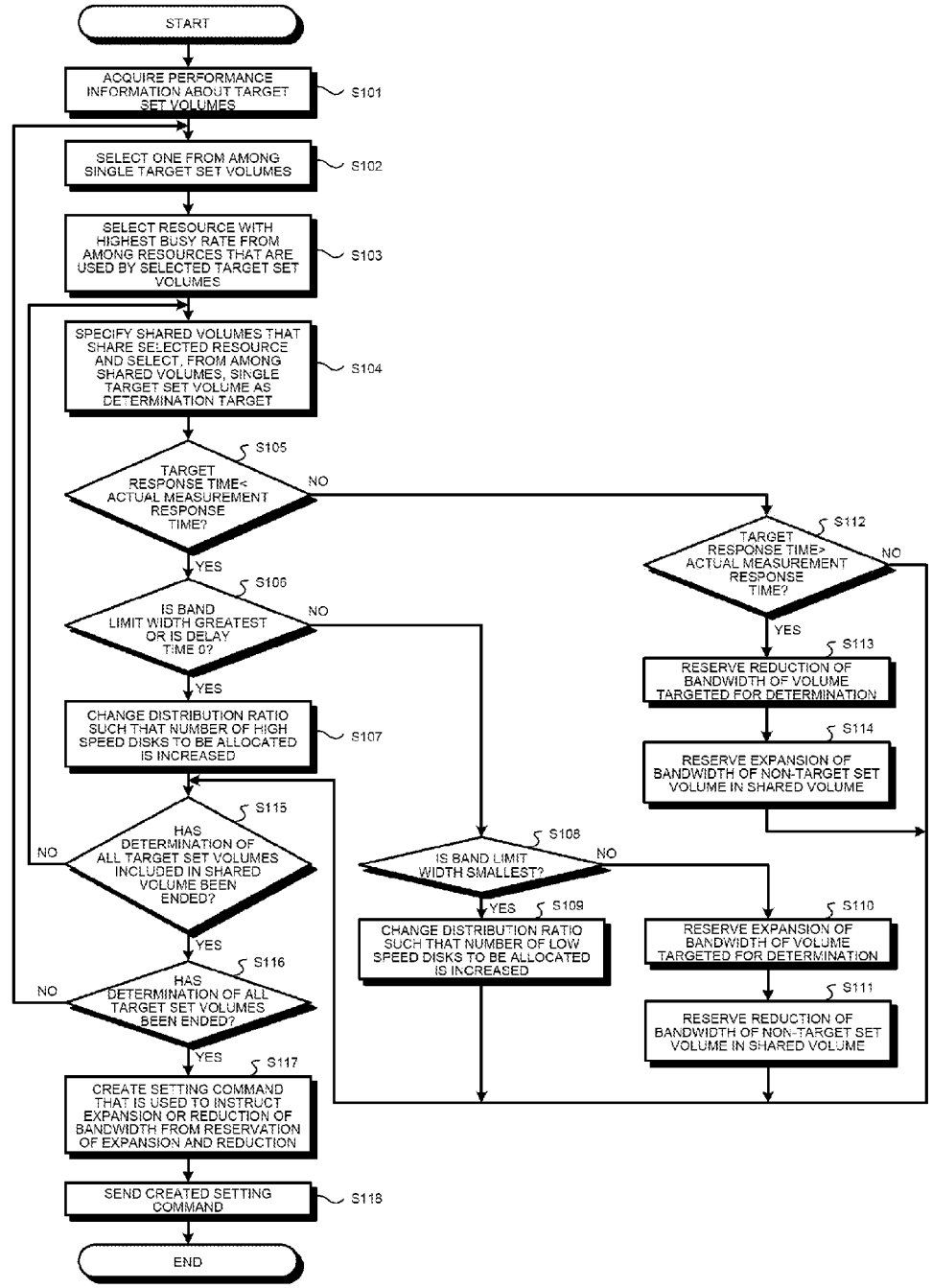
FIG. 8 is a flowchart illustrating the flow, in detail, of the performance adjustment process performed on volumes by the operation management server according to the first embodiment.

In the following, a process of the performance adjustment of the volumes 232 performed by the operation management server 1 according to the first embodiment will be described with reference to FIG. 8. FIG. 8 is a flowchart illustrating the flow, in detail, of the performance adjustment process performed on volumes by the operation management server according to the first embodiment. The flowchart illustrated in FIG. 8 indicates, in detail, the process performed by the operation management server 1 at Step S31 illustrated in FIG. 7.

The performance management unit 102 acquires the performance information about the target set volumes from the volume performance information file 143 (Step S101).

The performance management unit 102 selects a single target set volume (Step S102).

The performance management unit 102 selects the resource with the highest busy rate from among the resources that are used by the selected target set volumes (Step S103).

Then, the performance management unit 102 specifies the shared volumes that share the selected resource. Furthermore, the performance management unit 102 selects a single target set volume from among the shared volumes (Step S104).

The performance management unit 102 determines whether the target response time of the selected target set volume is smaller than the actual measurement response time (Step S105). If the target response time is smaller than the actual measurement response time (Yes at Step S105), the performance management unit 102 determines whether the band limit width is the greatest or whether the delay time is 0 (Step S106).

If the performance management unit 102 determines that the band limit width is the greatest or determines that the delay time is 0 (Yes at Step S106), the performance management unit 102 determines to change the distribution ratio such that the number of the high speed disks to be allocated is increased (Step S107).

Furthermore, if the band limit width is not the greatest and the delay time is not 0 (No at Step S106), the performance management unit 102 determines whether the band limit width is the smallest (Step S108). If the band limit width is the smallest (Yes at Step S108), the performance management unit 102 determines to change the distribution ratio such that the number of the low speed disks to be allocated is increased (Step S109).

In contrast, if the band limit width is not the smallest (No at Step S108), the performance management unit 102 reserves an expansion of the bandwidth of the target set volume of the volume that is the target for the determination (Step S110).

Furthermore, the performance management unit 102 reserves a reduction of the bandwidth of the non-target set volume in the shared volume (Step S111).

In contrast, if the target response time is greater than the actual measurement response time (No at Step S105), the performance management unit 102 determines whether the target response time of the selected target set volume is greater than the actual measurement response time (Step S112). If the target response time is not greater than the actual measurement response time (No at Step S112), the performance management unit 102 proceeds to Step S115.

In contrast, if the target response time is greater than the actual measurement response time (Yes at Step S112), the performance management unit 102 reserves a reduction of the bandwidth of the target set volume of the volume that are targeted for the determination (Step S113).

Furthermore, the performance management unit 102 reserves an expansion of the bandwidth of the non-target set volume in the shared volume (Step S114).

The performance management unit 102 determines whether the determination of all of the target set volumes included in the shared volumes has been ended (Step S115). Namely, the performance management unit 102 determines whether the second selection has been performed on all of the target set volumes included in the shared volumes. If a target set volume that has not been subjected to the determination is present (No at Step S115), the performance management unit 102 returns to Step S104.

In contrast, if the determination of all of the target set volumes included in the shared volumes has been ended (Yes at Step S115), the performance management unit 102 determines whether the determination of all of the target set volumes has been ended (Step S116). Namely, the performance management unit 102 determines whether the first selection has been performed on all of the target set volumes. If a target set volume that has not been subjected to the determination is present (No at Step S116), the performance management unit 102 returns to Step S102.

In contrast, if the determination of all of the target set volumes has been ended (Yes at Step S116), the performance management unit 102 decides to expand or reduce the bandwidth of each of the volumes 232 on the basis of the reservation of the expansion and the reduction performed on each of the volumes 232. Then, the performance management unit 102 creates a setting command that is used to instruct the expansion or the reduction of the bandwidth of each of the decided volumes 232 and creates a setting command that is used to instruct a change in the distribution ratio (Step S117).

Thereafter, the performance management unit 102 sends the created setting command to the performance adjustment unit 253 (Step S118).

As described above, the storage management device according to the first embodiment, a target response time is calculated by using a performance ratio in accordance with the fixed distribution ratio and the level of the target performance of the various kinds of disks. Then, the storage management device automatically adjusts the bandwidth of the volumes that share the resource that has a high load and the distribution ratio of the disks and sets the response time of each of the target set volumes within the target response time. Consequently, the storage management device according to the first embodiment can easily and appropriately perform the performance adjustment in the storage system by using the band limit width and can appropriately adjust the distribution ratio of the disks.

Furthermore, in the first embodiment described above, the adjustment of the band limit width and the distribution ratio of the disks is performed by using a response time as the performance index; however, another value may also be used for the performance index as long as the performance of a transmission path for each of the volumes can be determined. For example, the IOPS or the throughput may also be used as the performance index. However, the magnitude of each of the IOPS and the throughput is an inverse of that of the response time. In other words, a value of a response time is decreased as the performance is better, whereas a value of each of the IOPS and the throughput is increased as the performance is better. Accordingly, when the performance management unit 102 decides, by using the IOPS or the throughput as the performance index, to expand or reduce the bandwidth or a distribution ratio of disks, the performance management unit 102 uses a condition for deciding an expansion or a reduction of the bandwidth and deciding the distribution ratio of the disks in an inverse manner that is used when a response time is used.

[b] Second Embodiment

Figure 9:
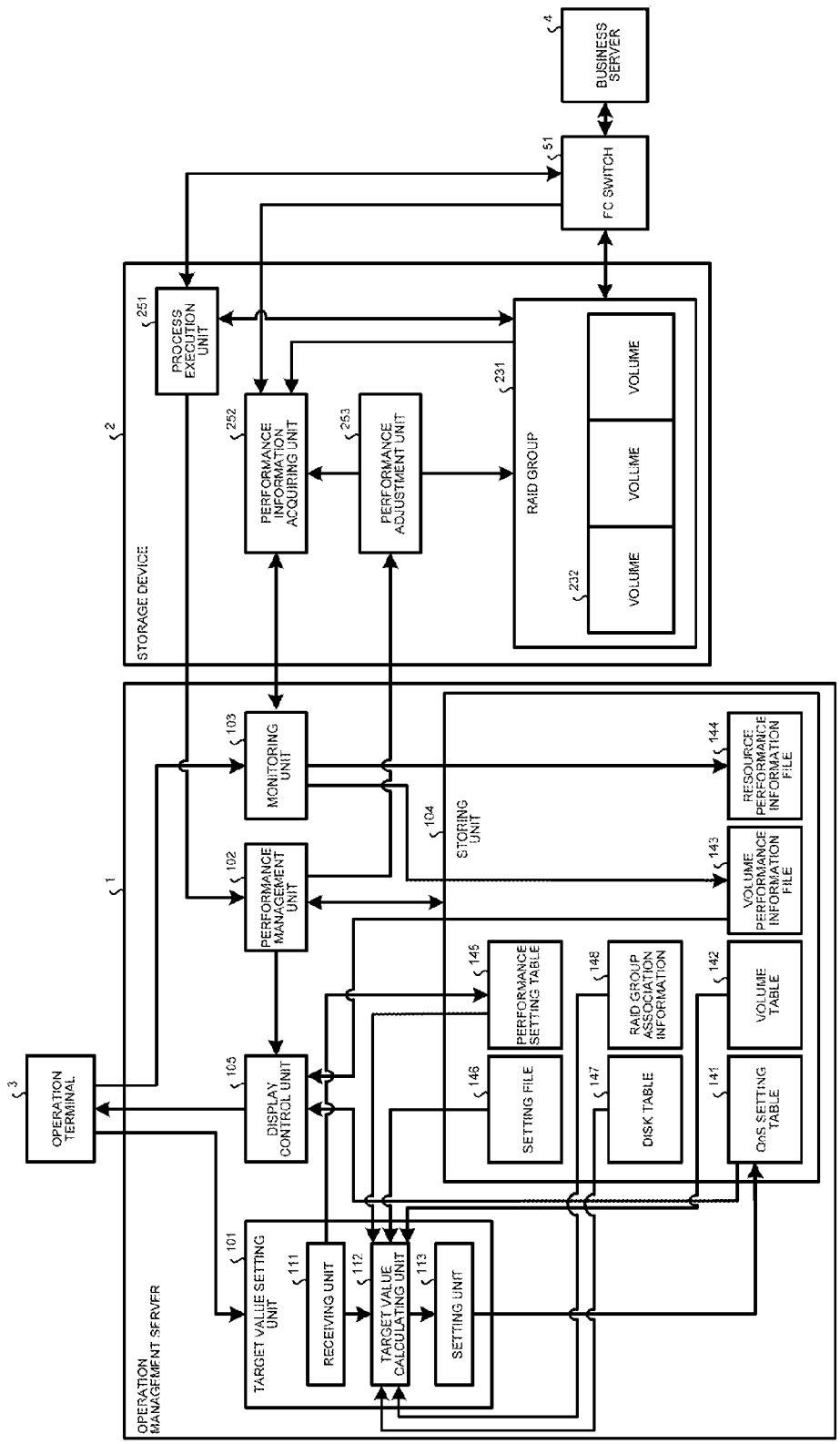
FIG. 9 is a block diagram illustrating an operation management server and a storage device according to a second embodiment.

In the following, a second embodiment will be described. An operation management server according to the second embodiment differs from the first embodiment in that the performance ratio of the performance level, i.e., the high performance, the medium performance, and the low performance, is changed by a specific type of the disks stored in the storage device is changed. In a description below, a performance ratio of each of the performance level, such as the high performance, the medium performance, and the low performance, is simply referred to as a "performance ratio". Thus, in a description below, a change in a performance ratio and calculation of a target response time will mainly be described. FIG. 9 is a block diagram illustrating an operation management server and a storage device according to a second embodiment. Furthermore, in below, descriptions of the components having the same functions as those described in the first embodiment will be omitted. In the second embodiment, a description will be given of a case in which a response time is used as the performance index.

The storing unit 104 stores therein a disk table 147 and RAID group association information 148. In the disk table 147, the type and the capacity of disks stored in the storage device 2 and information on a RAID group are registered. The type of the disks 203 is, for example, an SSD, an Online disk, a Nearline disk, or the like.

Furthermore, the RAID group association information 148 is information indicating, in an associated manner, a RAID group and a pool in which the RAID group is included. The pool mentioned here is a unit of single group of a plurality of RAID groups that are collectively constituted from the same type of the disks 203.

Furthermore, in the volume table 142 stored in the storing unit 104, information on a pool to which each of the volumes 232 belongs is registered.

The target value calculating unit 112 previously stores therein a performance ratio according to the type of the disks 203 mounted on the storage device 2. For example, the target value calculating unit 112 stores therein a performance ratio, which is obtained when an SSD is present as a high speed disk, as high performance:medium performance:low performance=1.2:1.9:30.0. Furthermore, the target value calculating unit 112 stores therein a performance ratio, which is obtained when an SSD is not present as a high speed disk, as high performance:medium performance:low performance=12.0:18.0:30.0. Here, for the ratio of each of the performance levels, similarly to a case of the first embodiment, the ratio that is obtained in a case in which the disks 203 included in the volume 232 are all SSDs is set as 1.

Here, there are some conceivable methods in which the distribution ratio of SSDs is 100%, i.e., a response time of the volumes 232 of all of the disks 203 that are SSDs is 1. For example, measurement result of the performance measurement that is previously performed in unloaded condition is defined in a setting file or the like and a performance ratio may also be determined on the basis of a case in which the value thereof is set to 1. Furthermore, a response time obtained when the disks 203 in the specific volumes 232 at that time are all SSDs may also be set to 1 or the average value of all may also be set to 1.

The target value calculating unit 112 acquires, from the performance setting table 145, a performance level that is set to each of the volumes 232. Furthermore, the target value calculating unit 112 acquires, from the volume table 142, a pool to which each of the volumes 232 belongs. Then, the target value calculating unit 112 acquires, from the RAID group association information 148, a RAID group associated with the acquired pool. Then, the target value calculating unit 112 acquires, from the disk table 147, information on the type of disks 203 belonging to the acquired RAID group. Then, the target value calculating unit 112 determines whether an SSD is present as a high speed disk in the pool to which the specified volumes 232 belong.

Here, each of the volumes 232 belongs one of the pools. Furthermore, a pool includes RAID groups with different speeds. Then, the RAID group includes the disks 203 with the same speed. Namely, if the type of the disks 203 included in each of the RAID groups can be found, it is possible to define the type of the disks 203 that can be used for the volumes 232.

For example, if an SSD is present, the target value calculating unit 112 determines that the performance ratio is 1.2:9.0:30.0. If no SSD is present, the target value calculating unit 112 determines that the performance ratio is 12.0:18.0:30.0.

Then, the target value calculating unit 112 transforms Equation 1 on the assumption that an SSD is 100%. For example, if an SSD is mounted on the storage device 2, the target value calculating unit 112 transforms the portion of $\{tn\text{cache}\times(T\div I)+Cn\text{cache}\}$ in Equation 1 and obtains Equation 7 below. Furthermore, if no SSD is present as a high speed disk, the target value calculating unit 112 uses, as a high speed disk, the disk 203 that has the highest speed from among the disks 203 other than SSDs; acquires the proportionality coefficient portion and the constant portion of the response time; and substitutes the acquired portion in Equation 7.

$$\{tn\text{cache}\times(T\div I)+Cn\text{cache}\}=\{t_{SSD}\times(T\div I)+C_{SSD}\} \quad (7)$$

Then, the target value calculating unit 112 calculates a temporary target response time by using Equation 1. Then, the target value calculating unit 112 calculates a target response time by multiplying a value associated with the performance level that is specified by the determined performance ratio by the temporary target response time.

Figure 10:
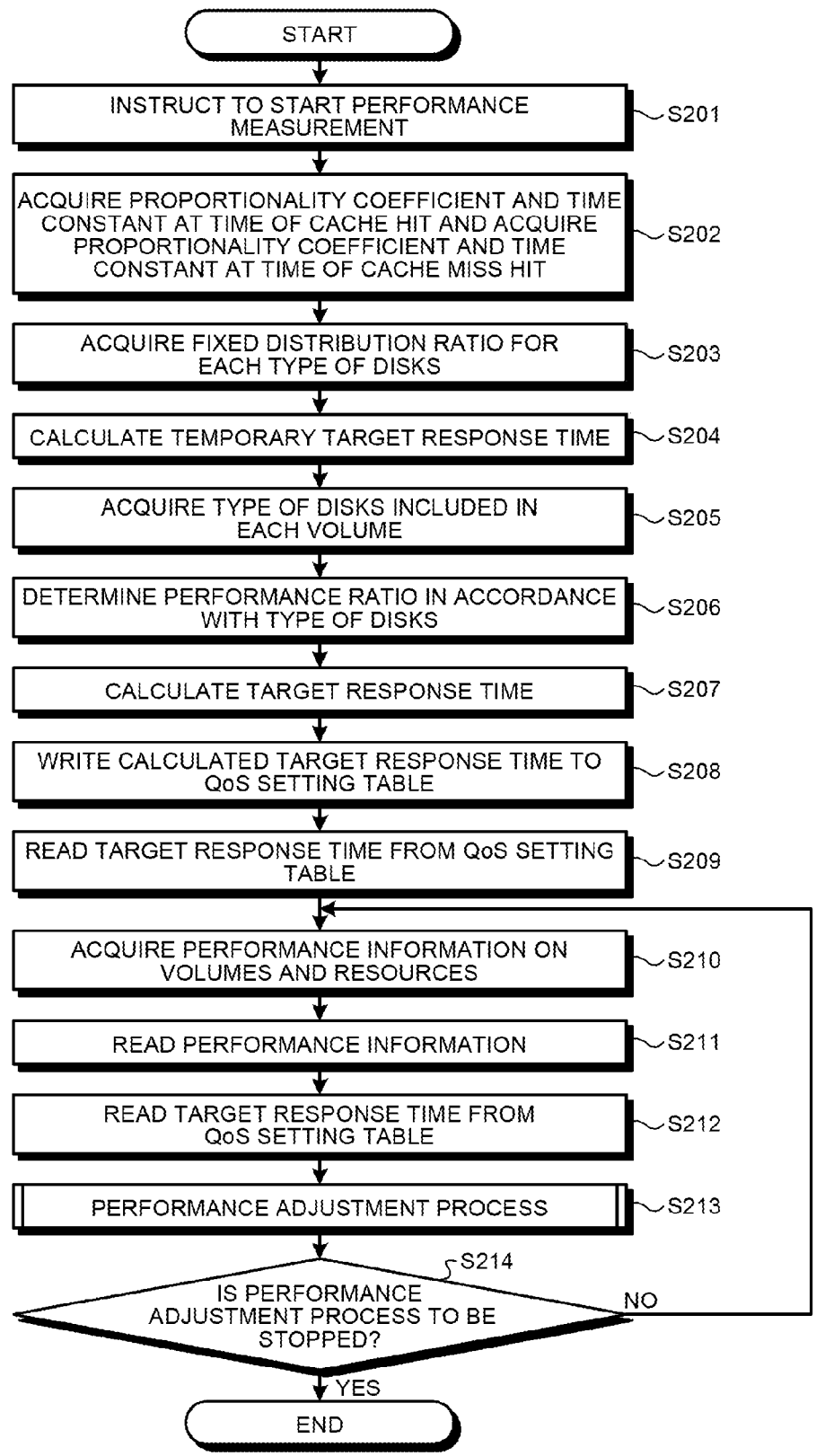
FIG. 10 is a flowchart illustrating the flow of a performance adjustment process performed by the operation management server according to the second embodiment.

Then, the flow of a performance adjustment performed by the operation management server 1 according to the second embodiment will be described with reference to FIG. 10. FIG. 10 is a flowchart illustrating the flow of the performance adjustment process performed by the operation management server according to the second embodiment.

The monitoring unit 103 receives an instruction to start the performance measurement from the operation terminal 3. Then, the monitoring unit 103 instructs the performance information acquiring unit 252 in the storage device 2 to start the performance measurement (Step S201).

The receiving unit 111 receives a performance level from the operation terminal 3. Then, the receiving unit 111 writes the received performance level in the performance setting table 145. Then, the target value calculating unit 112 reads the performance level of each of the target set volumes from the performance setting table 145. Furthermore, the target value calculating unit 112 acquires a proportionality coefficient and a time constant at the time of cache hit for each performance level and acquires a proportionality coefficient and a time constant at the time of cache miss hit for each performance level (Step S202).

Furthermore, the target value calculating unit 112 acquires a fixed distribution ratio for each type of the disks 203 (Step S203).

Then, the target value calculating unit 112 calculates a temporary target response time of each of the target set volumes by using Equations 1 and 2 (Step S204).

Then, the target value calculating unit 112 acquires the type of the disks 203 included in each of the volumes 232 (Step S205).

Then, the target value calculating unit 112 determines the performance ratio of the performance level of each of the volumes in accordance with the type of the disks 203 included in each of the volumes 232 (Step S206).

Then, the target value calculating unit 112 calculates a target response time of each of the target set volumes by multiplying a performance ratio according to the performance level specified to each of the target set volumes by the calculated temporary target response time (Step S207).

Then, the target value calculating unit 112 writes the calculated target response time of each of the target set volumes to the QoS setting table 141 (Step S208).

Then, the display control unit 105 reads the target response time of each of the target set volumes from the QoS setting table 141 and notifies the operation terminal 3 of the read target response time (Step S209).

The monitoring unit 103 acquires the performance information on the volumes and the resources (Step S210). Then, the monitoring unit 103 registers the performance information on the volumes in the volume performance information file 143 and registers the performance information on the resources in the resource performance information file 144.

The performance management unit 102 reads the performance information on the volumes and the resources from the volume performance information file 143 and the resource performance information file 144 (Step S211).

The performance management unit 102 and the display control unit 105 reads the target response time from the QoS setting table 141 (Step S212). Furthermore, the performance management unit 102 and the display control unit 105 acquire the actual measurement response time from the volume performance information file 143. Then, the display control unit 105 sends the target response time and the actual measurement response time to the operation terminal 3.

Furthermore, the performance management unit 102 performs the performance adjustment process performed in the storage device 2 (Step S213). For example, the performance management unit 102 performs the performance adjustment process indicated by the flowchart illustrated in FIG. 8.

The performance management unit 102 determines whether the performance adjustment process is to be stopped (Step S214). For example, if the performance management unit 102 receives, from an operator from the operation terminal 3, an instruction to stop the performance adjustment process, the performance management unit 102 determines that the performance adjustment process performed in the storage device 2 is to be stopped.

If the performance management unit 102 determines that the performance adjustment process is not to be stopped (No at Step S214), the performance management unit 102 returns to Step S210. In contrast, if the performance management unit 102 determines that the performance adjustment process is to be stopped (Yes at Step S214), the performance management unit 102 ends the performance adjustment performed on the storage device 2.

As described above, the storage management device according to the second embodiment calculates a target response time by using a performance ratio according to the type of disks mounted on the storage device. Consequently, the storage management device according to the second embodiment can easily and appropriately perform performance adjustment in accordance with the operation state of the storage device and, furthermore, can appropriately adjust the distribution ratio of the disks.

MODIFICATION

In the second embodiment, the performance ratio that is obtained on the assumption that a response time of a volume of all of the disks 203 that are SSDs is set to 1 is used; however, the performance ratio is not limited to this. For example, if no SSD is mounted, a performance ratio obtained on the assumption that a response time of only the disk 203 other than SSDs is set to 1 may also be used. In this case, if a high speed disk is an SSD, the target value calculating unit 112 sets the performance ratio as 1.2:9.0:30. Furthermore, if a high speed disk is other than an SSD, the target value calculating unit 112 sets the performance ratio as 1.2:1.8:3.0.

In this example, if a high speed disk is an SSD, the performance ratio of the high performance to the low performance is a factor of 25; however, if a high speed disk is not an SSD, the performance ratio of the high performance to the low performance is only a factor of 2.5.

Furthermore, in addition to the type of the disks 203, the performance ratio may also be determined in accordance with the capacity ratio of the high speed disk to all of the disks 203 mounted on the storage device.

For example, if a high speed disk is an SSD and the percentage of SSDs with respect to the total number of disks is equal to or greater than 50%, the target value calculating unit 112 sets the performance ratio as 1.2:9.0:30.0. Furthermore, if a high speed disk is an SSD and the percentage of SSDs with respect to the total number of disks is less than 50%, the target value calculating unit 112 sets the performance ratio as 1.8:9.0:30.0. Furthermore, in another case, the target value calculating unit 112 sets the performance ratio as 1.2:9.0:30.

In this example, the performance ratio is considered on the assumption that the response time of a volume of all of the disks that are SSDs is set to 1. In this case, if the ratio of the SSDs to all disks is low, that performance ratio is made to be decreased. In other cases, because the high speed disks are not the SSDs, a difference in the performance ratio becomes small when compared with a case in which a high speed disk is an SSD.

Furthermore, in the description above, because the performance ratio is represented by a response time, the high performance is represented by a small number and the low performance is represented by a large number. In contrast, the performance adjustment and the performance ratio may also be defined by using the IOPS or the throughput. In this case, the relationship between values and the performance is inverted.

[c] Third Embodiment

In the following, a third embodiment will be described. An operation management server according to the third embodiment uses a distribution ratio, which was used as the reference to determine a performance ratio, as an initial value that is used when the actual distribution ratio is determined. The operation management server according to the third embodiment is also represented by the block diagram illustrated in FIG. 3. In a description below, it is assumed that components having the same function as that performed in the first embodiment have the same function unless otherwise noted. In the third embodiment, a description will be given of a case in which a response time is used as the performance index.

The performance management unit 102 acquires a target response time from the QoS setting table 141. Furthermore, the performance management unit 102 acquires, from the target value calculating unit 112, a distribution ratio that was used as the reference when the performance ratio is determined. Then, the performance management unit 102 sets the distribution ratio acquired from the target value calculating unit 112 as the initial value of the distribution ratio.

The performance management unit 102 obtains a target response time by substituting the initial value of the distribution ratio into Equation 3 and sets the obtained time as the estimate response time.

Then, the performance management unit 102 repeatedly calculates an estimate response time by changing, in stages, combinations such that, from the initial value of the distribution ratio, a distribution ratio that can be used in an access distribution function. Then, the performance management unit 102 specifies a combination of a distribution ratio with a value closest to the target response time that is set in the selection volume.

Figure 11:
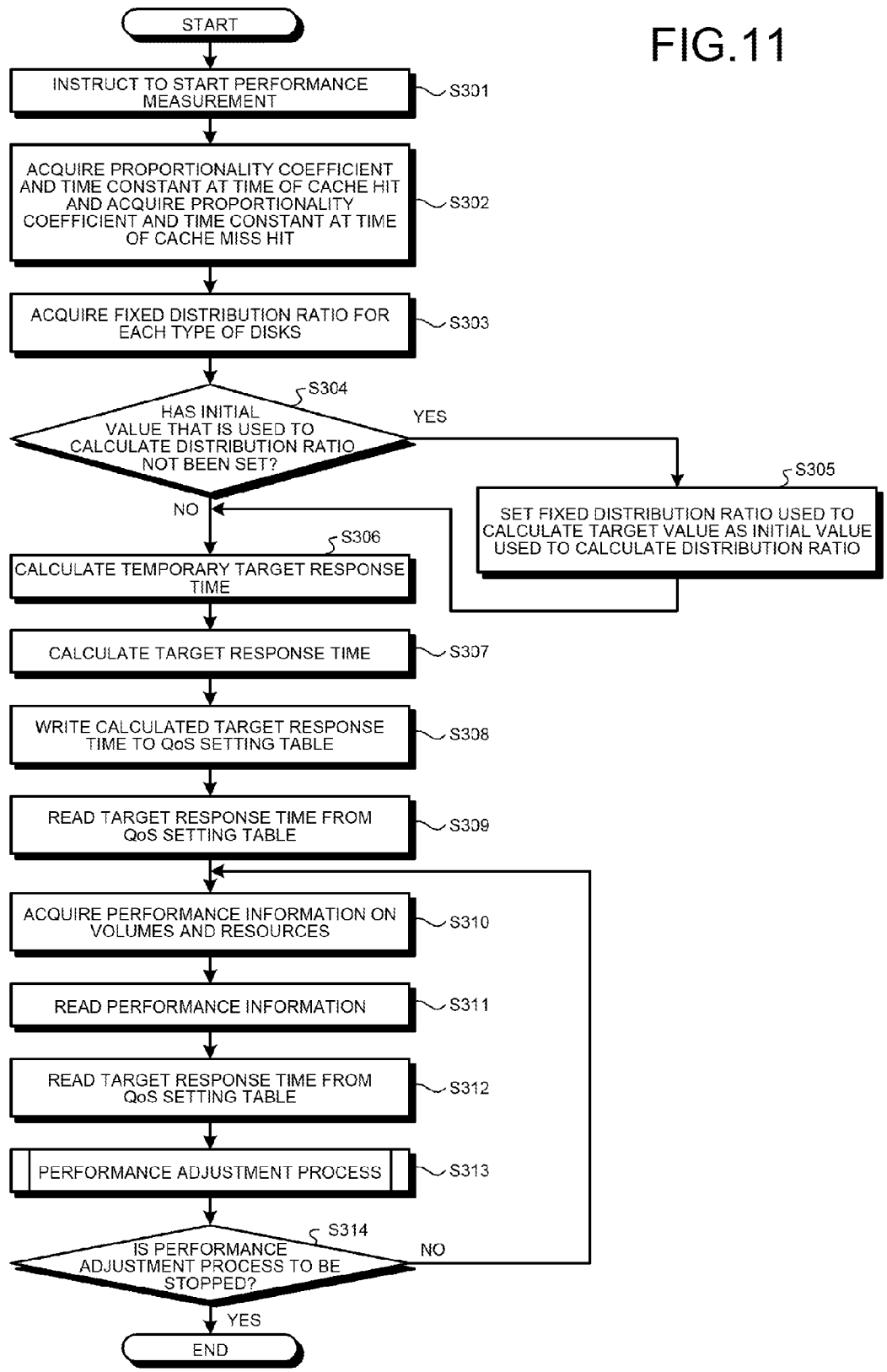
FIG. 11 is a flowchart illustrating the flow of a performance adjustment process performed by an operation management server according to a third embodiment.

In the following, the flow of performance adjustment performed by the operation management server 1 according to the third embodiment will be described with reference to FIG. 11. FIG. 11 is a flowchart illustrating the flow of a performance adjustment process performed by an operation management server according to a third embodiment.

The monitoring unit 103 receives an instruction to start the performance measurement from the operation terminal 3. Then, the monitoring unit 103 instructs the performance information acquiring unit 252 in the storage device 2 to start the performance measurement (Step S301).

The receiving unit 111 receives a performance level from the operation terminal 3. Then, the receiving unit 111 writes the received performance level to the performance setting table 145. Then, the target value calculating unit 112 reads a performance level of each of the target set volumes from the performance setting table 145. Furthermore, the target value calculating unit 112 acquires a proportionality coefficient and a time constant at the time of cache hit for each performance level and acquires a proportionality coefficient and a time constant at the time of cache miss hit for each performance level (Step S302).

Furthermore, the target value calculating unit 112 acquires a fixed distribution ratio for each type of the disks 203 (Step S303).

Then, the target value calculating unit 112 determines whether the initial value that is used to calculate a distribution ratio of the disks 203 has not been set (Step S304). If the initial value has not been set (Yes at Step S304), the target value calculating unit 112 sets the fixed distribution ratio that is used to calculate a target value as an initial value that is used to calculate a distribution ratio (Step S305). If the initial value has already been set (No at Step S304), the target value calculating unit 112 proceeds to Step S306.

Then, the target value calculating unit 112 calculates a temporary target response time of each of the target set volumes by using Equations 1 and 2 (Step S306).

Then, the target value calculating unit 112 calculates a target response time of each of the target set volumes by multiplying the performance ratio according to the performance level specified to each of the target set volumes by the calculated temporary target response time (Step S307).

Then, the target value calculating unit 112 writes the calculated target response time of each of the target set volumes to the QoS setting table 141 (Step S308).

Thereafter, the display control unit 105 reads the target response time of each of the target set volumes from the QoS setting table 141 and notifies the read time to the operation terminal 3 (Step S309).

The monitoring unit 103 acquires the performance information on the volumes and the resources (Step S310). Then, the monitoring unit 103 registers the performance information on the volumes in the volume performance information file 143 registers the performance information on the resources in the resource performance information file 144.

The performance management unit 102 reads the performance information on the volumes and the resources from the volume performance information file 143 and the resource performance information file 144 (Step S311).

The performance management unit 102 and the display control unit 105 read the target response time from the QoS setting table 141 (Step S312). Furthermore, the performance management unit 102 and the display control unit 105 acquire the actual measurement response time from the volume performance information file 143. Then, the display control unit 105 sends the target response time and the actual measurement response time to the operation terminal 3.

Furthermore, the performance management unit 102 performs the performance adjustment process on the storage device 2 (Step S313). For example, the performance management unit 102 performs the performance adjustment process indicated by the flowchart illustrated in FIG. 8. However, in this case, the performance management unit 102 adjusts the distribution ratio by using the distribution ratio that was set as the initial value.

The performance management unit 102 determines whether the performance adjustment process is to be stopped (Step S314). For example, if the performance management unit 102 receives, from an operator from the operation terminal 3, an instruction to stop the performance adjustment process, the performance management unit 102 determines to stop the performance adjustment process performed in the storage device 2.

If the performance management unit 102 determines that the performance adjustment process is not to be stopped (No at Step S314), the performance management unit 102 returns to Step S310. In contrast, if the performance adjustment process determines that the performance adjustment process is to be stopped (Yes at Step S314), the performance management unit 102 ends the performance adjustment performed in the storage device 2.

As described above, the storage management device according to the third embodiment determines a distribution ratio of disks by using, as an initial value, the distribution ratio that was used as the reference when the performance ratio was determined. Consequently, the storage management device according to the third embodiment can convergence the distribution ratio of the disks so as to approach the target response time in a short time and thus can promptly adjust the distribution ratio of the disks.

According to an aspect of an embodiment of the storage management device, the performance adjustment method, and the performance adjustment program disclosed in the present invention, an advantage is provided in that the distribution ratio of disks can be appropriately changed when performance adjustment is performed in automated tiered storage.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage management device that manages a storage device including a plurality of types of storage units with different speed to which sends and receives data via transmission resources, the storage management device comprising:
   a memory region; and
   a controller that receives an input of information of a performance level which is selected from a plurality of performance levels which is divided into predetermined stages with respect to a storage area that is allocated by using the different types of the storage units,
   stores the information of the performance level in the memory region,
   calculates, based on the received performance level and a fixed distribution ratio that is previously determined for each type of the storage units, a performance target value of the performance of sending and receiving data to and from the storage area,
   determines, based on the calculated performance target value, an allocating distribution ratio for each type of the storage units allocated to the storage area,
   determines, based on the performance target value calculated by the performance target value calculating, a band distribution with respect to the storage area, and
   instructs the storage device to re-allocate the storage area by using the determined allocating distribution ratio and adjust the bandwidth in accordance with the determined band distribution.

2. The storage management device according to claim 1, wherein the controller manages a performance ratio for each of the performance level according to the allocating distribution ratio, calculates a hit rate for each type of the storage units based on the allocating distribution ratio, calculates a first target value based on both the calculated hit rate and a performance value for each type of the storage units, calculates a second target value by multiplying the performance ratio of the performance level specified by the first target value, and determines the calculated second target value as the performance target value of the storage area.

3. The storage management device according to claim 1, wherein the controller changes, in stages, the allocating distribution ratios by using the fixed distribution ratio as an initial value and brings the performance of the storage area closer to the performance target value.

4. A performance adjustment method of a storage device including a plurality of types of storage units with different speed to which sends and receives data via transmission resources, the performance adjustment method comprising:
   receiving an input of information of a performance level which is selected from a plurality of performance levels which is divided into predetermined stages with respect to a storage area that is allocated by using the different types of the storage units,
   storing the information of the performance level in a memory region,
   calculating, based on the received performance level and a fixed distribution ratio that is previously determined for each type of the storage units, a performance target value of the performance of sending and receiving data to and from the storage area;
   determining, based on the calculated performance target value, an allocating distribution ratio for each type of the storage units allocated to the storage area and a band distribution with respect to the storage area; and
   instructing the storage device to re-allocate the storage area by using the determined allocating distribution ratio and adjust the bandwidth in accordance with the determined band distribution.

5. The storage management device according to claim 1, further comprising a cache, wherein the controller manages a performance ratio for each of the performance level according to the allocating distribution ratio, calculates a cache hit rate of the cache for each type of the storage units based on the allocating distribution ratio, calculates a first performance target value based on both the calculated cache hit rate and a performance value for each type of the storage units, calculates a second performance target value by multiplying the performance ratio of the performance level specified by the first performance target value, and determines the calculated second performance target value as the performance target value of the storage area.

6. The storage management device according to claim 2, wherein the controller changes the performance ratio based on the types of storage units in the storage device.

7. A non-transitory computer-readable recording medium having stored therein a performance adjustment program for a storage device including a plurality of types of storage units with different speed to which sends and receives data via transmission resources, the performance adjustment program that causes a computer to execute a process comprising:
   receiving an input of information of a performance level which is selected from a plurality of performance levels which is divided into predetermined stages with respect to a storage area that is allocated by using the different types of the storage units,
   storing the information of the performance level in a memory region,
   calculating, based on the received performance level and a fixed distribution ratio that is previously determined for each type of the storage units, a performance target value of the performance of sending and receiving data to and from the storage area;
   determining, based on the calculated performance target value, an allocating distribution ratio for each type of the storage units allocated to the storage area and a band distribution with respect to the storage area; and
   instructing the storage device to re-allocate the storage area by using the determined allocating distribution ratio and adjust the bandwidth in accordance with the determined band distribution.

8. The storage management device according to claim 1, wherein the controller manages a predetermined allocating distribution ratio for each type of the storage units, acquires the type of the storage units included in the storage area, and determines, from among the stored allocating distribution ratios, in accordance with the type of the acquired storage units, the allocating distribution ratio that is used to calculate the performance target value.

* * * * *